(12) United States Patent
Wyszkowski et al.

(10) Patent No.: US 12,513,048 B2
(45) Date of Patent: Dec. 30, 2025

(54) APPARATUS AND METHOD FOR GENERATING NETWORK SLICE IN WIRELESS COMMUNICATION SYSTEM

(71) Applicant: Samsung Electronics Co., Ltd., Suwon-si (KR)

(72) Inventors: Przemyslaw Wyszkowski, Warsaw (PL); Jan Kienig, Warsaw (PL); Donghyeok Ho, Suwon-si (KR); Ganesh Chandrasekaran, Suwon-si (KR); Lukasz Filimowski, Warsaw (PL); Marcin Pilarczyk, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/867,054

(22) Filed: Jul. 18, 2022

(65) Prior Publication Data

US 2022/0353138 A1    Nov. 3, 2022

Related U.S. Application Data

(63) Continuation of application No. PCT/KR2021/001015, filed on Jan. 26, 2021.

(30) Foreign Application Priority Data

Feb. 7, 2020    (KR) .......................... 10-2020-0015119

(51) Int. Cl.
*H04L 41/084* (2022.01)
*H04L 41/0895* (2022.01)
(Continued)

(52) U.S. Cl.
CPC .......... *H04L 41/084* (2013.01); *H04L 41/342* (2022.05); *H04L 41/5048* (2013.01);
(Continued)

(58) Field of Classification Search
CPC ............ H04L 41/0806; H04L 41/0843; H04L 41/5048; H04L 41/342; H04L 41/40;
(Continued)

(56) References Cited

U.S. PATENT DOCUMENTS 10,791,040 B2    9/2020 Vrzic
10,958,524 B2    3/2021 Yi et al.
(Continued)

FOREIGN PATENT DOCUMENTS

CN    108770016 A    11/2018
EP    2 989 751 B1    10/2017
(Continued)

OTHER PUBLICATIONS

GSMA, From Vertical Industry Requirements to Network Slice Characteristics, https://www.gsma.com/solutions-and-impact/technologies/networks/wp-content/uploads/2018/09/5G-Network-Slicing-Report-From-Vertical-Industry-Requirements-to-Network-Slice-Characteristics.pdf, Aug. 2018, pp. 1-10. (Year: 2018).*
(Continued)

*Primary Examiner* — Gregory Todd
(74) *Attorney, Agent, or Firm* — Jefferson IP Law, LLP

(57) ABSTRACT

An apparatus and a method for generating a descriptor for a network slice are provided. The apparatus includes a transceiver, a memory storing one or more instructions, and at least one processor configured to execute the one or more instructions stored in the memory to obtain requirements for a network slice, determine at least one of a plurality of network slice templates (NSTs), a plurality of network slice descriptors (NSLDs), or a plurality of network slice instances (NSIs), based on the obtained requirements, when at least one of the plurality of NSTs is determined, determine at least one specific node to substitute for a plurality of abstract nodes included in the at least one of the plurality of
(Continued)

NSTs, based on the obtained requirements, and generate a descriptor for a network slice, based on the determined at least one specific node.

15 Claims, 23 Drawing Sheets

(51) Int. Cl.
| | |
|---|---|
| *H04L 41/342* | (2022.01) |
| *H04L 41/40* | (2022.01) |
| *H04L 41/5041* | (2022.01) |
| *H04W 4/50* | (2018.01) |
| *H04W 16/10* | (2009.01) |
| *H04W 24/02* | (2009.01) |

(52) U.S. Cl.
CPC ............ *H04W 4/50* (2018.02); *H04W 16/10* (2013.01); *H04W 24/02* (2013.01); *H04L 41/0895* (2022.05); *H04L 41/40* (2022.05)

(58) Field of Classification Search
CPC .... H04L 41/084; H04W 48/18; H04W 88/18; H04W 24/02; H04W 16/10; H04W 4/50
See application file for complete search history.

(56) References Cited

U.S. PATENT DOCUMENTS

| | | | |
|---|---|---|---|
| 11,012,311 | B2 | 5/2021 | Giust et al. |
| 11,283,684 | B2 | 3/2022 | Li et al. |
| 2018/0132138 | A1* | 5/2018 | Senarath ............. H04L 41/0813 |
| 2019/0260641 | A1 | 8/2019 | Giust et al. |
| 2020/0014608 | A1* | 1/2020 | Xu ....................... H04L 41/0806 |
| 2020/0084107 | A1* | 3/2020 | Li ....................... H04L 41/0895 |
| 2021/0075678 | A1* | 3/2021 | Seetharaman ...... H04L 41/5048 |
| 2023/0040700 | A1* | 2/2023 | Karapantelakis ... H04L 41/5067 |
| 2023/0232283 | A1* | 7/2023 | Wajda .................. H04W 48/18 370/229 |

FOREIGN PATENT DOCUMENTS

| | | |
|---|---|---|
| KR | 10-2019-0120833 A | 10/2019 |
| WO | 2018/171587 A1 | 9/2018 |
| WO | 2019/057011 A1 | 3/2019 |
| WO | 2019/184967 A1 | 10/2019 |

OTHER PUBLICATIONS

Jose Ordonez-Lucena et al., The Creation Phase in Network Slicing: From a Service Order to an Operative Network Slice, 2018 European Conference on Networks and Communications (EuCNC), Apr. 25, 2018.

Pol Alemany et al., Experimental Validation of Network Slicing Management for Vertical Applications on Multimedia Real-Time Communications over a Packet/Optical Network, 2019 21st International Conference on Transparent Optical Networks (ICTON), Sep. 19, 2019.

International Search Report and Written Opinion dated Apr. 15, 2021, issued in International Patent Application No. PCT/KR2021/001015.

Jose Ordonez-Lucena et al., The Creation Phase in Network Slicing: From a Service Order to an Operative Network Slice, 2018 European Conference on Networks and Communications (EuCNC), Jun. 2018.

3rd Generation Partnership Project; Technical Specification Group Services and System Aspects; Management and orchestration; Provisioning (Release 16), 3GPP TS 28.531 V16.4.0 (Dec. 2019), Jan. 2020.

3rd Generation Partnership Project; Technical Specification Group Services and System Aspects; Management and orchestration; 5G Network Resource Model (NRM); Stage 2 and stage 3 (Release 16), 3GPP TS 28.541 V16.3.0 (Dec. 2019), Jan. 2020.

Samsung, 5G Core Vision Revolutionary changes in core with the arrival of 5G, Technical Report, Apr. 2019.

Network Functions Virtualisation (NFV) Release 3; Management and Orchestration; VNF Descriptor and Packaging Specification, ETSI GS NFV-IFA 011 V3.3.1, Sep. 2019.

James O'Sullivan et al., Towards a Generic Slice Template using GSMA NEST GST, James O'Sullivan & Kevin McDonnell, Huawei Technologies, 5G Riders on the Storm Catalyst, Mar. 29, 2019.

GSM Association, Official Document NG.116—Generic Network Slice Template Version 1.0, May 23, 2019.

Network Functions Virtualisation (NFV) Release 2; Management and Orchestration; Network Service Templates Specification, ETSI GS NFV-IFA 014 V2.6.1, Apr. 2019.

Network Functions Virtualisation (NFV); Resiliency Requirements, ETSI GS NFV-REL 001 V1.1.1, Jan. 2015.

MP_ODINI, Network Slicing: 5G Network Slice Management, Feb. 25, 2019, https://community.hpe.com/t5/Telecom-IQ/Part-2-Network-Slicing-5G-Network-Slice-Management/ba-p/7036016#.XWUbScXgqY1.

Network Functions Virtualisation (NFV) Release 3; Management and Orchestration; Os-Ma-Nfvo reference point—Interface and Information Model Specification, ETSI GS NFV-IFA 013 V3.2.1, Apr. 2019.

Network Functions Virtualisation (NFV) Release 3; Management and Orchestration; Or-Vnfm reference point—Interface and Information Model Specification, ETSI GS NFV-IFA 007 V3.3.1, Sep. 2019.

Korean Office Action dated Feb. 27, 2025, issued in Korean Patent Application No. 10-2020-0015119.

* cited by examiner (a) Pre-generation of Slice descriptors (b) Ad-hoc generation of Slice descriptors

FIG. 18

| Attribute group | Attribute | Qualifier | Cardinality | Content | Description |
|---|---|---|---|---|---|
| metadata | id | M | 1 | Identifier | id of NST/NSST |
| metadata | name | M | 1 | String | name of NST/NSST |
| metadata | description | O | 1 | String | human readable description of NST/NSST |
| exposed capabilities | type | M | 1 | String/Identifier | type of Network Slice or Network Slice Subnet to be produced by this NST/NSST |
| exposed capabilities | SLA | O | | | SLA capabilities of the slice that the NST describes, such as: latency, total bandwidth, experiential bandwidth, jitter, availability |
| exposed capabilities | functional | O | 1 | | functional capabilities of the slice that the NST describes, such as: mobility level (stationary, nomadic, restricted mobility, fully mobility) security level (encryption, archivization etc) |
| exposed capabilities | capacity | O | 1 | | coverage capabilities of the slice that the NST describes expressed as: geographical coverage TAC, LAC, RAC lists |
| exposed capabilities | coverage | O | 1 | | list of operations supported by the slice that NST describes with associated workflows containing operations on NST internal entities (Abstract Nodes) |
| exposed capabilities | sharing level | O | 1 | Enum | sharing level of the slice that NST decribes, such as: shareable non-shareable |
| exposed capabilities | operations | O | 0..n | | list of operations supported by the slice that NST describes with associated workflows containing operations on NST internal entities (Abstract Nodes) |
| abstract nodes | network slice subnets abstract nodes | M | 0..n | AbstractNetworkSliceSubnetNode | represent Network Slice Subnets. To be substitute with matching candidates during Abstract Nodes Substitution process |
| abstract nodes | managed function abstract nodes | M | 0..n | AbstractManagedFunctionNode | represent Managed Functions. To be substitute with matching candidates during Abstract Nodes Substitution process |
| abstract nodes | connectivity abstract nodes | M | 0..n | AbstractConnectivityNode | represent connectivity between Network Slice Subnets and Managed Functions. To be substitute with matching candidates during Abstract Nodes Substitution process |
| policies | Performance Management policie | O | 1..n | Rule | list of policies related to Performance Management such as: formulas to calculate complex KPIs from collected PM data and KPIs from collected nestes MFs, Subnets, Connectivity Nodes and Network Service reporting periods thresholds |
| policies | Fault Management policies | O | 1..n | Rule | list of policies related to Fault Management such as: formulas to generate complex Alarms basing on Alarms collected from collected nestes MFs, Subnets, Connectivity Nodes and Network Service |

FIG. 19

| Attribute group | Attribute | Qualifier | Cardinality | Content | Description |
|---|---|---|---|---|---|
| metadata | id | M | 1 | Identifier | id of NSS(Network Slice Subnet) |
| metadata | name | M | 1 | String | name of this NSS |
| metadata | description | O | 1 | String | human readable description of NSS |
| requirements | Network Slice Subnet type | M | 1 | String/Identifier | required type of NSS according to type hierarchy |
| requirements | SLA requirements | O | 1 | | SLA requirements for the against the Network Slice Subnet, such as:<br>latency<br>total bandwidth<br>experiential bandwidth<br>jitter<br>availability |
| requirements | functional requirements | O | 0..n | | functional requirements for the Network Slice Subnet |
| requirements | capacity requirements | O | 1 | | capacity requirements for the Network Slice Subnet |
| requirements | capacity requirements | | | Enum | sharing level requirement for the Network Slice Subnet, such as:<br>shareable<br>non-shareable |
| requirements | coverage | O | 1 | | coverage capabilities of the slice that the NST describes expressed as:<br>geographical coverage<br>TAC, LAC, RAC lists |
| requirements | operations | O | 0..n | | list of operations supported by the Slice/Subnet that NSLD/NSLSD describes with associated workflows containing operations on internal entities (Abstract Nodes) |
| policies | Performance Management policies | O | 0..n | Rule | list of PM policies such as:<br>list of KPIs to be collected<br>reporting periods |
| policies | Fault Management policies | O | 0..n | Rule | list of FM policies such as:<br>list of Alarms to be collected |

FIG. 20

| Attribute group | Attribute | Qualifier | Cardinality | Content | Description |
|---|---|---|---|---|---|
| metadata | id | M | 1 | Identifier | id of this MF(managed function) |
| metadata | name | O | 1 | String | name of this MF |
| metadata | description | O | 1 | String | human readable description of MF |
| requirements | MF type | O | 1 | String/Identifier | required type of MF according to type hierarchy |
| requirements | SLA | O | 1 | | SLA requirements for the MF such as:<br>latency<br>total bandwidth<br>experiential bandwidth<br>jitter<br>availability |
| requirements | functional requirements | O | 0..n | | functional requirements for the MF |
| requirements | capacity requirements | O | 1 | | capacity requirements for the MF |
| requirements | capacity requirements | | | Enum | coverage requirements against the MF expressed as:<br>geographical coverage<br>TAC, LAC, RAC lists |
| requirements | coverage | O | 1 | | sharing level requirement for the MF such as:<br>shareable<br>non-shareable |
| requirements | operations | | | | list of operations required to be supported by the MF |
| policies | Performance Management policies | O | 0..n | Rule | list of PM policies such as:<br>list of KPIs to be collected<br>reporting periods |
| policies | Fault Management policies | O | 0..n | Rule | list of FM policies such as:<br>list of Alarms to be collected |
| configuration | abstract application configuration | O | 1 | Yang or Netconf or JSON | application configuration using 3GPP 28.541 attributes ( ) |

FIG. 21

| Attribute group | Attribute | Qualifier | Cardinality | Content | Description |
|---|---|---|---|---|---|
| metadata | id | M | 1 | Identifier | id of this Connectivity Node |
| metadata | name | M | 1 | String | name of this Connectivity Node |
| metadata | description | O | 1 | String | human readable description of Connectivity Node |
| requirements | maxBitrateRequirements | M | 1 | Number | Specifies the throughput requirement of the link. In order to generate "VirtualLinkProfile"."maxBitrateRequirements" attribute while generating NsDf |
| requirements | minBitrateRequirements | M | 1 | Number | Specifies the throughput requirement of the link. In order to generate "VirtualLinkProfile"."minBitrateRequirements" attribute while generating NsDf |
| requirements | layerProtocol | M | 1..N | Enum | Identifies the protocols that the VL uses (Ethernet, MPLS, ODU2, IPV4, IPV6, Pseudo-Wire). In order to generate "NSD"."NsVirtualLinkDesc"."ConnectivityType" attribute |
| requirements | flowPattern | M | 0..1 | String | Identifies the flow pattern of the connectivity (Line, Tree, Mesh, etc.). In order to generate "NSD"."NsVirtualLinkDesc"."ConnectivityType" attribute |
| requirements | latency | M | 1 | Number | Specifies the maximum latency in ms. In order to generate "NSD". "NsVirtualLinkDesc"."VirtualLinkDf"."QoS" attribute |
| requirements | packetDelayVariation | M | 1 | Number | Specifies the maximum jitter in ms. In order to generate "NSD". "NsVirtualLinkDesc"."VirtualLinkDf"."QoS" attribute |
| requirements | packetLossRatio | M | 0..1 | Number | Specifies the maximum packet loss ratio. In order to generate "NSD". "NsVirtualLinkDesc"."VirtualLinkDf"."QoS" attribute |
| requirements | priority | M | 0..1 | Integer | Specifies the priority level in case of congestion on the underlying physical links. In order to generate "NSD"."NsVirtualLinkDesc"."VirtualLinkDf"."QoS" attribute |
| requirements | capacity requiremetns | O | 1 | Number | capacity requirements for the Connectivity Node |
| requirements | sharing level requirement | O | 1 | Enum | sharing level requirement for the Connectivity Node such as: shareable non-shareable |
| policies | Performance Management policies | O | 0..n | Rule | list of PM policies such as: list of KPIs to be collected reporting periods |
| policies | Fault Management policies | O | 0..n | Rule | list of FM policies such as: list of Alarms to be collected |

FIG. 22

| Attribute group | Attribute | Qualifier | Cardinality | Content | Description | Generation method |
|---|---|---|---|---|---|---|
| metadata | reference to origin NST/NSST | O | 1 | Identifier | reference to the NST/NSST that was used to create this NSLD/NSLSD | NST/NSST Id is known to the Slice Descriptors Generator |
| metadata | id | M | 1 | Identifier | id of this NSLD/NSLSD | automatically generated, for example as uuid or manually entered |
| metadata | name | O | 1 | String | name of this NSLD/NSLSD | manually entered by user or automatically generated basing on NST name and other NST capabilities |
| metadata | type | M | 1 | String/Identifier | type of Network Slice or Network Slice Subnet described by this NSLD/NSLSD | copied from NST/NSST |
| metadata | description | O | 1 | String | human readable description of this NSLD/NSLSD | manually entered by user or automatically generated basing on NSLD/NSLSD capabilities |

APPARATUS AND METHOD FOR GENERATING NETWORK SLICE IN WIRELESS COMMUNICATION SYSTEM

CROSS-REFERENCE TO RELATED APPLICATION(S)

This application is a continuation application, claiming priority under § 365(c), of an International application No. PCT/KR2021/001015, filed on Jan. 26, 2021, which is based on and claims the benefit of a Korean patent application number 10-2020-0015119, filed on Feb. 7, 2020, in the Korean Intellectual Property Office, the disclosure of which is incorporated by reference herein in its entirety.

BACKGROUND

1. Field

The disclosure relates to an apparatus and method for generating a network slice in a wireless communication system.

2. Description of Related Art

Wireless communication technology has been developed over the generations mainly for services targeting humans, e.g., voice, multimedia, and data services. Following the commercialization of 5th generation (5G) communication systems, it is predicted that connected devices which are exponentially increasing will be connected to a communication network. Examples of things connected to the network may include automobiles, robots, drones, home appliances, displays, smart sensors installed in various infrastructures, construction equipment, and plant equipment. Mobile devices are expected to evolve into various form factors such as augmented reality (AR) glasses, virtual reality (VR) headsets, and hologram devices. In the $6^{th}$ generation (6G) era, efforts are being made to develop enhanced 6G communication systems in order to provide various services by connecting hundreds of billions of devices and things. For these reasons, the 6G communication systems are called beyond 5G systems.

In 6G communication systems predicted to be realized around 2030, a maximum data rate is tera (i.e., 1,000 giga) bps, and a radio latency is 100 microseconds (μsec). That is, compared to 5G communication systems, the data rate is 50 times faster and the radio latency is reduced to 1/10 in the 6G communication systems.

To achieve the high data rate and the ultra-low latency, the 6G communication systems are being considered for implementation in a terahertz band (e.g., a band from 95 gigahertz (GHz) to 3 terahertz (THz)). In the terahertz band, compared to a millimeter wave (mmWave) band adopted for 5G, it is predicted that the importance of a technology capable of ensuring a signal arrival distance, i.e., coverage, will increase due to more serious path loss and atmospheric absorption. As major technologies for ensuring coverage, multi-antenna transmission technologies which are superior in terms of coverage to a radio frequency (RF) element, an antenna, and orthogonal frequency division multiplexing (OFDM), e.g., new waveforms, beamforming, massive multiple-input and multiple-output (massive MIMO), full dimensional MIMO (FD-MIMO), array antennas, and large scale antennas, need to be developed. In addition, new technologies such as metamaterial-based lenses and antennas, high-dimensional spatial multiplexing using orbital angular momentum (OAM), and reconfigurable intelligent surface (RIS) are being discussed to increase the coverage of terahertz-band signals.

To increase frequency efficiency and improve system networks, a full duplex technology by which uplinks and downlinks simultaneously use the same frequency resources at the same time, a network technology that integrally uses satellites and high-altitude platform stations (HAPSs), a network structure innovation technology that supports mobile base stations and allows network operation optimization and automation, a dynamic spectrum sharing technology through collision avoidance based on spectrum usage prediction, an artificial intelligence (AI)-based communication technology that utilizes AI from the design and has end-to-end AI support functions to realize system optimization, a next-generation distributed computing technology that realizes services of complexity beyond the limitation of user equipment (UE) computing power by utilizing ultra-high-performance communication and computing resources (e.g., mobile edge computing (MEC) or cloud computing), etc. are being developed for 6G communication systems. Furthermore, attempts are being made to strengthen the connectivity between devices, to optimize a network, to promote implementation of network entities with software, and to increase the openness of wireless communication through the design of a new protocol to be used in the 6G communication systems, the implementation of a hardware-based security environment, the development of a mechanism for the safe use of data, and the development of a technology related to a method of preserving privacy.

Due to the research on and the development of 6G communication systems, it is expected that the next hyper-connected experience will become possible through the hyper-connectivity of the 6G communication systems, which includes not only the connection between things but also the connection between people and things. Specifically, the 6G communication systems are expected to provide services such as truly immersive extended reality (truly immersive XR), high-fidelity mobile hologram, and digital replica. In addition, the 6G communication systems will be applied in various fields such as industry, medical care, automobiles, and home appliances by providing services such as remote surgery, industrial automation, and emergency response through security and reliability enhancement.

Network slicing technology has been introduced to support various services in various network structures. Network slicing is a technology for logically configuring a network with a set of network functions (NFs) for supporting a particular service, and separating the same from other slices. One UE may access two or more slices to receive various services.

A network slice that is appropriate to support a particular service from among the various service is being designed and generated by a communication service provider or a developer. However, to support increasingly diversified services, a technology for automatically generating a network slice that meets requirements of each service is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for generating a network slice in a wireless communication system to effectively provide services.

Additional aspects will be set forth in part in the description which follows and, in part, will be apparent from the description, or may be learned by practice of the presented embodiments.

In accordance with an aspect of the disclosure, an electronic device for obtaining requirements for a network slice, determining at least one of a plurality of network slice templates (NSTs), a plurality of network slice descriptors (NSLDs), or a plurality of network slice instances (NSIs), based on the obtained requirements, when at least one of the plurality of NSTs is determined, determining at least one specific node to substitute for a plurality of abstract nodes included in the at least one of the plurality of NSTs, based on the obtained requirements, and generating a descriptor for a network slice, based on the determined at least one specific node is provided. The electronic device includes a transceiver, a memory storing one or more instructions, and at least one processor configured to execute the one or more instructions stored in the memory to obtain requirements for a network slice, determine at least one of a plurality of network slice templates (NSTs), a plurality of network slice descriptors (NSLDs), or a plurality of network slice instances (NSIs), based on the obtained requirements, when at least one of the plurality of NSTs is determined, determine at least one specific node to substitute for a plurality of abstract nodes included in the at least one of the plurality of NSTs, based on the obtained requirements, and generate a descriptor for a network slice, based on the determined at least one specific node.

The at least one processor may be further configured to execute the one or more instructions to determine a first candidate including at least one NST satisfying a preset first criterion from among the plurality of NSTs, determine a second candidate including at least one NSLD satisfying a preset second criterion from among the plurality of NSLDs, determine a third candidate including at least one NSI satisfying a preset third criterion from among the plurality of NSIs, determine a matching score between the obtained requirements and each of the NST, the NSLD, and the NSI respectively included in the first, second, and third candidates, and determine at least one having a highest matching score from among the NST, the NSLD, and the NSI respectively included in the first, second, and third candidates, as the at least one of the plurality of NSTs, the plurality of NSLDs, or the plurality of NSIs.

The obtained requirements may include at least one of a service level agreement, service provider preference, a latency requirement, a bandwidth requirement, user equipment (UE) functions, subscription information, a cost, or a service type, and the matching score may be determined based on similarity between the obtained requirements and each of the NST, the NSLD, and the NSI respectively included in the first, second, and third candidates.

The at least one processor may be further configured to execute the one or more instructions to, when at least one of the plurality of NSTs or the plurality of NSLDs is determined, transmit, to an orchestrator configured to generate a network slice, the determined at least one.

The plurality of abstract nodes may include at least one of a network slice subnet abstract node, a connectivity abstract node, or a managed function abstract node.

At least one abstract node satisfying the obtained requirements may include at least one network slice subnet abstract node, and the at least one processor may be further configured to execute the one or more instructions to determine at least one of a network slice subnet template (NSST), a network slice subnet descriptor (NSLSD), an existing network slice subnet instance (NSSI), a network service descriptor (NSD), or an existing network service instance, based on similarity to the obtained requirements, and determine the determined at least one as at least one specific node to substitute for the at least one network slice subnet abstract node.

At least one abstract node satisfying the obtained requirements may include at least one connectivity abstract node, and the at least one processor may be further configured to execute the one or more instructions to determine at least one of a virtual link, an NSD, or an existing network service instance, based on similarity to the obtained requirements, and determine the determined at least one as at least one specific node to substitute for the at least one connectivity abstract node.

At least one abstract node satisfying the obtained requirements may include at least one managed function abstract node, and the at least one processor may be further configured to execute the one or more instructions to determine at least one of an existing managed function, a virtual network function (VNF) descriptor (VNFD), an NSD, a VNF instance, or a network service instance, and determine the determined at least one as at least one specific node to substitute for the at least one managed function abstract node.

The at least one processor may be further configured to execute the one or more instructions to, when at least one of the plurality of NSTs is determined, substitute a plurality of abstract nodes included in the determined at least one of the plurality of NSTs, with a part or an entirety of an element included in at least one of an NSST, an NSLSD, an existing NSSI, an NSD, or an existing network service instance, determine whether each of the plurality of abstract nodes is substituted with a part or an entirety of the element satisfying the obtained requirements, when it is determined that each of the plurality of abstract nodes is not substituted with a part or an entirety of the element satisfying the obtained requirements, substitute at least one abstract node determined as not being substituted, with a part or an entirety of at least one element satisfying the obtained requirements, and, when it is determined that each of the plurality of abstract nodes is substituted with a part or an entirety of the element satisfying the obtained requirements, generate the descriptor for a network slice, based on the substituted part or entirety of the at least one element.

The at least one processor may be further configured to execute the one or more instructions to generate a new NST, and update the plurality of NSTs, based on the generated new NST.

The at least one processor may be further configured to execute the one or more instructions to store at least one of the NSLD or the NSD, based on the generated new descriptor for a network slice.

The at least one processor may be further configured to execute the one or more instructions to generate an NSLD, based on the network slice subnet abstract node and the connectivity abstract node, generate an NSD, based on the connectivity abstract node and the managed function abstract node, and generate the descriptor for a network slice, based on the generated NSLD and NSD.

In accordance with another aspect of the disclosure, an operating method of an electronic device for generating a descriptor for a network slice is provided. The operating method includes obtaining requirements for a network slice, determining at least one of a plurality of network slice templates (NSTs), a plurality of network slice descriptors (NSLDs), or a plurality of network slice instances (NSIs), based on the obtained requirements, when at least one of the plurality of NSTs is determined, determining at least one specific node to substitute for a plurality of abstract nodes included in the at least one of the plurality of NSTs, based on the obtained requirements, and generating a descriptor for a network slice, based on the determined at least one specific node.

The determining of the at least one of the plurality of NSTs, the plurality of NSLDs, or the plurality of NSIs may include determining a first candidate including at least one NST satisfying a preset first criterion from among the plurality of NSTs, determining a second candidate including at least one NSLD satisfying a preset second criterion from among the plurality of NSLDs, determining a third candidate including at least one NSI satisfying a preset third criterion from among the plurality of NSIs, determining a matching score between the obtained requirements and each of the NST, the NSLD, and the NSI respectively included in the first, second, and third candidates, and determining at least one having a highest matching score from among the NST, the NSLD, and the NSI respectively included in the first, second, and third candidates, as the at least one of the plurality of NSTs, the plurality of NSLDs, or the plurality of NSIs.

The obtained requirements may include at least one of a service level agreement, service provider preference, a latency requirement, a bandwidth requirement, user equipment (UE) functions, subscription information, a cost, or a service type, and the matching score may be determined based on similarity between the obtained requirements and each of the NST, the NSLD, and the NSI respectively included in the first, second, and third candidates.

The plurality of abstract nodes may include at least one of a network slice subnet abstract node, a connectivity abstract node, or a managed function abstract node.

At least one abstract node satisfying the obtained requirements may include at least one network slice subnet abstract node, and the determining of the at least one specific node may include determining at least one of a network slice subnet template (NSST), a network slice subnet descriptor (NSLSD), an existing network slice subnet instance (NSSI), a network service descriptor (NSD), or an existing network service instance, based on similarity to the obtained requirements, and determining the determined at least one as at least one specific node to substitute for the at least one network slice subnet abstract node.

At least one abstract node satisfying the obtained requirements may include at least one connectivity abstract node, and the determining of the at least one specific node may include determining at least one of a virtual link, an NSD, or an existing network service instance, based on similarity to the obtained requirements, and determining the determined at least one as at least one specific node to substitute for the at least one connectivity abstract node.

At least one abstract node satisfying the obtained requirements may include at least one managed function abstract node, and the determining of the at least one specific node may include determining at least one of an existing managed function, a virtual network function (VNF) descriptor (VNFD), an NSD, a VNF instance, or a network service instance, and determining the determined at least one as at least one specific node to substitute for the at least one managed function abstract node.

The operating method may further include generating a new NST, based on the determined at least one abstract node, and updating the plurality of NSTs, based on the generated new NST.

The determining of the at least one specific node may include, when at least one of the plurality of NSTs is determined, substituting a plurality of abstract nodes included in the determined at least one of the plurality of NSTs, with a part or an entirety of an element included in at least one of an NSST, an NSLSD, an existing NSSI, an NSD, or an existing network service instance, determining whether each of the plurality of abstract nodes is substituted with a part or an entirety of the element satisfying the obtained requirements, when it is determined that each of the plurality of abstract nodes is not substituted with a part or an entirety of the element satisfying the obtained requirements, and substituting at least one abstract node determined as not being substituted, with a part or an entirety of at least one element satisfying the obtained requirements, and the generating of the descriptor for a network slice may include, when it is determined that each of the plurality of abstract nodes is substituted with a part or an entirety of the element satisfying the obtained requirements, generating the descriptor for a network slice, based on the substituted part or entirety of the at least one element.

The generating of the descriptor for a network slice may include generating an NSLD, based on at least one specific node determined to substitute for the network slice subnet abstract node and the connectivity abstract node, generating an NSD, based on at least one specific node determined to substitute for the connectivity abstract node and the managed function abstract node, and generating the descriptor for a network slice, based on the generated NSLD and NSD.

In accordance with another aspect of the disclosure, a computer-readable recording medium has stored therein one or more programs to be executed by one or more processors of a computing device to control the computing device to obtain requirements for a network slice, determine at least one of a plurality of network slice templates (NSTs), a plurality of network slice descriptors (NSLDs), or a plurality of network slice instances (NSIs), based on the obtained requirements, when at least one of the plurality of NSTs is determined, determine at least one specific node to substitute for a plurality of abstract nodes included in the at least one of the plurality of NSTs, based on the obtained requirements, and generate a descriptor for a network slice, based on the determined at least one specific node is provided.

According to an embodiment of the disclosure, a program is stored in the computer-readable recording medium to execute, on a computer, the operating method according to an embodiment of the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 18 is Table showing information included in an NST, according to an embodiment of the disclosure;

FIG. 19 is Table showing information included in network slice subnet abstract nodes, according to an embodiment of the disclosure;

FIG. 20 is Table showing information included in managed function abstract nodes, according to an embodiment of the disclosure;

FIG. 21 is Table showing information included in connectivity abstract nodes, according to an embodiment of the disclosure of the disclosure; and FIG. 22 is Table showing information included in metadata, according to an embodiment of the disclosure.

The same reference numerals are used to represent the same elements throughout the drawings.

DETAILED DESCRIPTION

Figure 1:
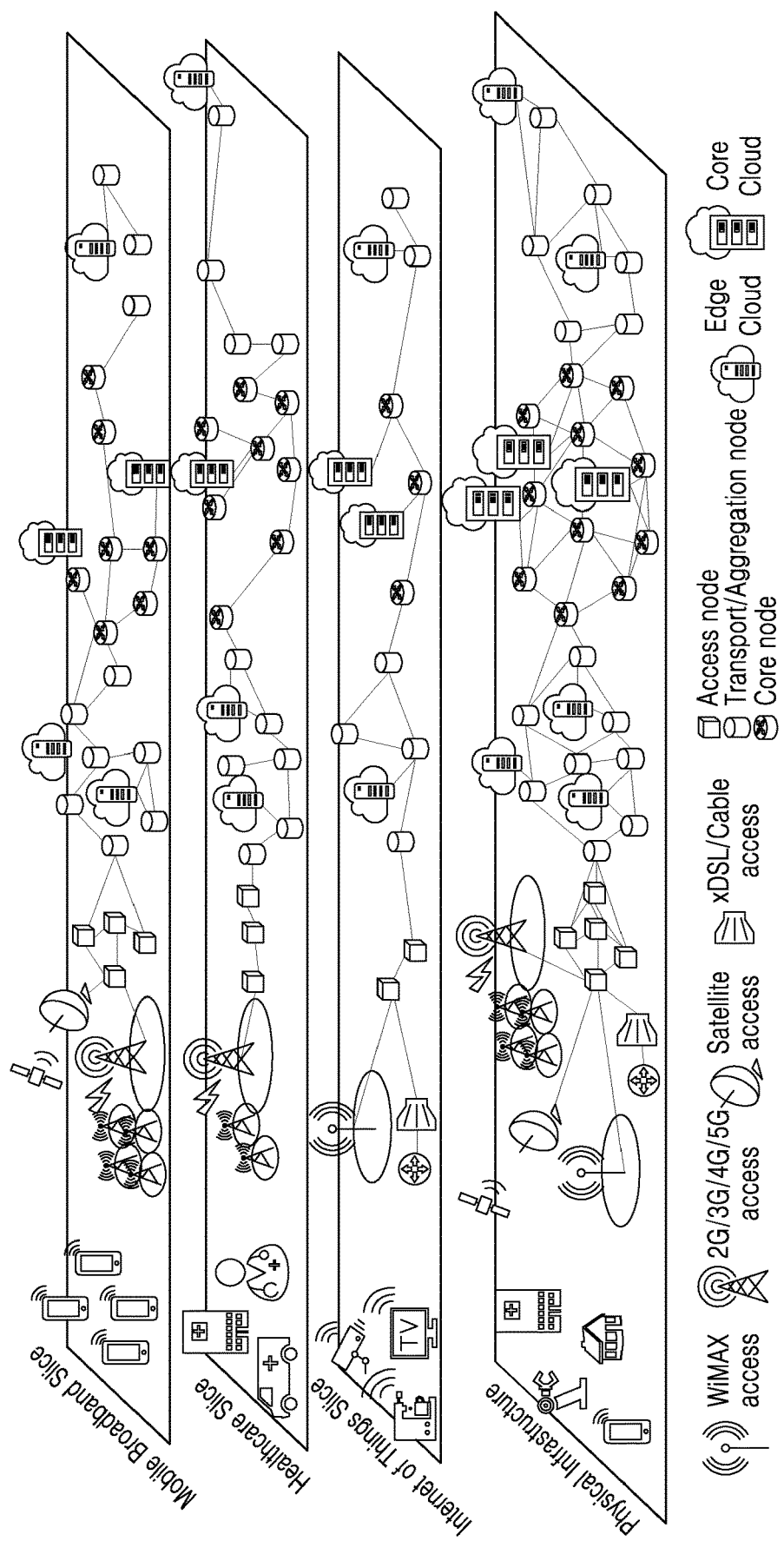
FIG. 1 is a schematic diagram showing a configuration of network slices according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding the disclosure. Accordingly, it should be apparent to those skilled in the art that the following description of various embodiments of the disclosure is provided for illustration purpose only and not for the purpose of limiting the disclosure as defined by the appended claims and their equivalents.

As used herein, the singular forms "a," "an," and "the" are intended to include the plural forms as well, unless the context clearly indicates otherwise. It will be understood that the terms "comprises," "comprising," "includes" and/or "including," when used herein, specify the presence of stated features, integers, steps, operations, elements, components, and/or groups thereof, but do not preclude the presence or addition of one or more other features, integers, steps, operations, elements, components, and/or groups thereof. Particularly, integers are examples for better understanding and it is noted that embodiments of the disclosure are not limited by the integers.

Terms such as "first" and "second" may be used to designate various elements, but the elements should not be limited by these terms. These terms are merely used to distinguish one element from another. The phrase "an embodiment" at various parts of this specification does not always designate the same embodiment of the disclosure. Throughout the disclosure, the expression "at least one of a, b or c" indicates only a, only b, only c, both a and b, both a and c, both b and c, all of a, b, and c, or variations thereof.

An embodiment of the disclosure may be represented as functional blocks and various processing operations. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executable by one or more processors. Furthermore, the disclosure might employ known technologies for electronic settings, signal processing, and/or data processing.

In the following description of the disclosure, a detailed description of known functions and configurations incorporated herein will be omitted when it may make the subject matter of the disclosure unclear. For convenience of explanation, when necessary, an apparatus and a method will be described together.

For convenience of explanation, the following description uses terms and names defined in the standards for 5th generation (5G) or new radio (NR), and long term evolution (LTE) systems. However, the disclosure is not limited by these terms and names, and is equally applicable to systems according to other standards.

That is, although a detailed description of embodiments of the disclosure will be mainly focused on the communication standards defined by the 3rd Generation Partnership Project (3GPP) and/or the European Telecommunications Standards Institute (ETSI), the subject matter of the disclosure is also applicable to other communication systems having similar technical backgrounds through slight modification without greatly departing from the scope of the disclosure at the discretion of one of ordinary skill in the art.

As used herein, a template refers to a set of general attributes capable of characterizing a particular type, and a network slice template (NST) may define a logical representation of network functions (NFs) and/or resources capable of providing required communication services and/or network capacities. That is, the NST may include abstract information for generating a network slice. The NST is a template for generating a network slice or a network slice instance (NSI), and may be used to provide a reference for generating the NSI. For example, the NST may include information about NFs to be included in and key performance indicators (KPIs) to be satisfied by the network slice.

A network slice subnet template (NSST) is a template for generating a network slice subnet or a network slice subnet instance (NSSI), and may be used to provide a reference for generating the NSSI.

As used herein, an instance may refer to one or a group of runtime entities capable of executing actual services. Network slicing may refer to a method of generating a plurality of logical networks by virtualizing a physical network. In this case, each of the generated plurality of logical networks may be referred to as an NSI. Therefore, each NSI may perform NFs corresponding to the characteristics of the NSI, and various service requirements may be satisfied when a plurality of NSIs perform appropriate network functions. One NSI may include at least one NSSI.

As used herein, abstract nodes are elements included in the NST or NSST, and may include abstract information required to provide required communication services and/or network capacities. In an embodiment, the NST or NSST may include at least one abstract node. For example, the NST or NSST may include a network slice subnet abstract node, a connectivity abstract node, and a managed function abstract node. The network slice subnet abstract node and the connectivity abstract node may include metadata information, requirements information, and policies information, and the managed function abstract node may include metadata information, requirements information, policies information, and configuration information. As such, the connectivity abstract node may include information about whether a connection is established between NFs. For example, the connectivity abstract node may include information about a connection type, a connection state, or whether a connection is established between NFs such as access management functions (AMFs), user plane functions (UPFs), and session management functions (SMFs).

As used herein, specific nodes may be nodes including specific information required to substitute for the abstract nodes. For example, the specific node may be a part or the entirety of an element included in at least one of an NSST, a network slice subnet descriptor (NSLSD), an existing NSSI, a network service descriptor (NSD), or an existing network service instance.

As used herein, a descriptor may intrinsically be an instance of an information model that provides sufficient details for an orchestrator to perform its job. That is, the descriptor may include a set of specific attributes capable of characterizing a particular type. A network slice descriptor (NSLD) may be a set of specific information required to generate a network slice, an NSI, or an NSSI. In an embodiment, the NSLD may include an NSLSD and a managed function descriptor. The NSLD may include life cycle management information including generation, provisioning, initialization, activation, inactivation, release, and termination, monitored information, and service warranty information for changing a slice structure or size. An NSD may be a set of specific information required to provide a network service or a virtualized network function (VNF). In an embodiment, the NSD may include an NSD as information for providing a network service, a virtual network function (VNF) descriptor (VNFD) as information for generating a VNF, a virtual link descriptor (VLD) as information for generating a virtual link, and a physical network function descriptor (PNFD).

Hereinafter, the disclosure will be described in detail by explaining embodiments of the disclosure with reference to the attached drawings.

FIG. 1 is a schematic diagram showing a configuration of network slices according to an embodiment of the disclosure.

Referring to FIG. 1, a mobile communication system (or a wireless communication system) may include a network that supports network slicing. That is, in the mobile communication system, one physical network may be configured and managed as logically divided network slices. A mobile communication service provider may provide dedicated network slices specialized for various services having different requirements. Each network slice may require a different type or amount of resources depending on service characteristics, and the mobile communication system may ensure the resources required by the network slice. For example, a network slice for providing a voice call service may frequently require control plane signaling, and be configured with NFs specialized therefor. A network slice for providing an Internet data service may frequently require large data traffic, and be configured with NFs specialized therefor.

According to an embodiment of the disclosure, in a 5G system defined by 3GPP, one network slice may be referred to as single-network slice selection assistance information (S-NSSAI). The S-NSSAI may include a slice/service type (SST) value and a slice differentiator (SD) value. The SST may represent the characteristics of a service supported by the slice (e.g., enhanced mobile broadband (eMBB), Internet of things (IoT), ultra-reliable low-latency communications (URLLC), or vehicle-to-everything (V2X)). The SD may be a value used as an additional identifier of a particular service defined by the SST.

Network slice selection assistance information (NSSAI) may include one or more S-NSSAI values. Examples of the NSSAI include configured NSSAI which is stored in a user equipment (UE), requested NSSAI which is requested by a UE, allowed NSSAI which is allowed to be used by a UE determined by a NF (e.g., an AMF or a network slice selection function (NSSF)) of a 5G core network, and subscribed NSSAI to which a UE is subscribed, but are not limited thereto.

In an embodiment, a mobile broadband slice may be a network slice generated mainly to increase the speed and performance of wireless transmission. The mobile broadband slice may include a network slice for services such as 4K/8K ultra-high definition (UHD), hologram, and augmented reality (AR)/virtual reality (VR). As such, to generate the mobile broadband slice, the communication service provider may configure the network slice with NFs specialized for a user plane to support the download of a significant amount of data.

In another embodiment, a healthcare slice may be a network slice generated to provide services such as real-time high-quality medical video transmission, healthcare information transmission through numerous sensors or measuring instruments, telemedicine, and remote surgery. As such, to generate the healthcare slice, the communication service provider may configure the network slice with NFs specialized for reliability.

In still another embodiment, an IoT slice may include a network slice for generating and sharing information by connecting all devices in daily life to a network. For example, for a mission-critical IoT slice, a 5G core (UP) and a related server (e.g., a vehicle-to-everything (V2X) server) may be included in an edge cloud to minimize transmission delay.

As another example, for a massive IoT service in which stationary sensors for measuring a temperature, a humidity, a rainfall, etc. are connected to a mobile communication network, unlike portable UEs, a function such as handover or location update may not be required. Alternatively, for a mission-critical IoT service such as autonomous driving or remote control of industrial robots, unlike a mobile broadband service, a low latency within several milliseconds (ms) may be required.

In another embodiment, a network slice for a physical infrastructure may include a network slice for communication between UEs or buildings. As such, the network slice for the physical infrastructure may support telecommunication such as Worldwide Interoperability for Microwave Access (WiMAX), communication using any digital subscriber line (xDSL)/cable, or communication using an edge cloud.

As such, an appropriate model, method, or tool for simplifying a design and deployment is required to construct complicated abstract entities included in various network slices. Many researches and standardization processes are being conducted on the main concept of network slicing, but a method of automatically designing network slices, a form to be provided, a level of details to be processed as descriptions, a method of expressing dependencies between elements, etc. are still unclear. Although the concept of NST is currently adopted in research on network slices, information to be included in the NST and a method of processing the NST are not discussed and thus research on the NST is required.

In addition, to provide dedicated network slices specialized for various services having different characteristics, a mobile communication service provider needs to determine the type and amount of resources required to configure a required network slice for each circumstance. As such, a method or apparatus for automatically generating an appropriate network slice when only requirements for a particular communication service are given is required.

Figure 2:
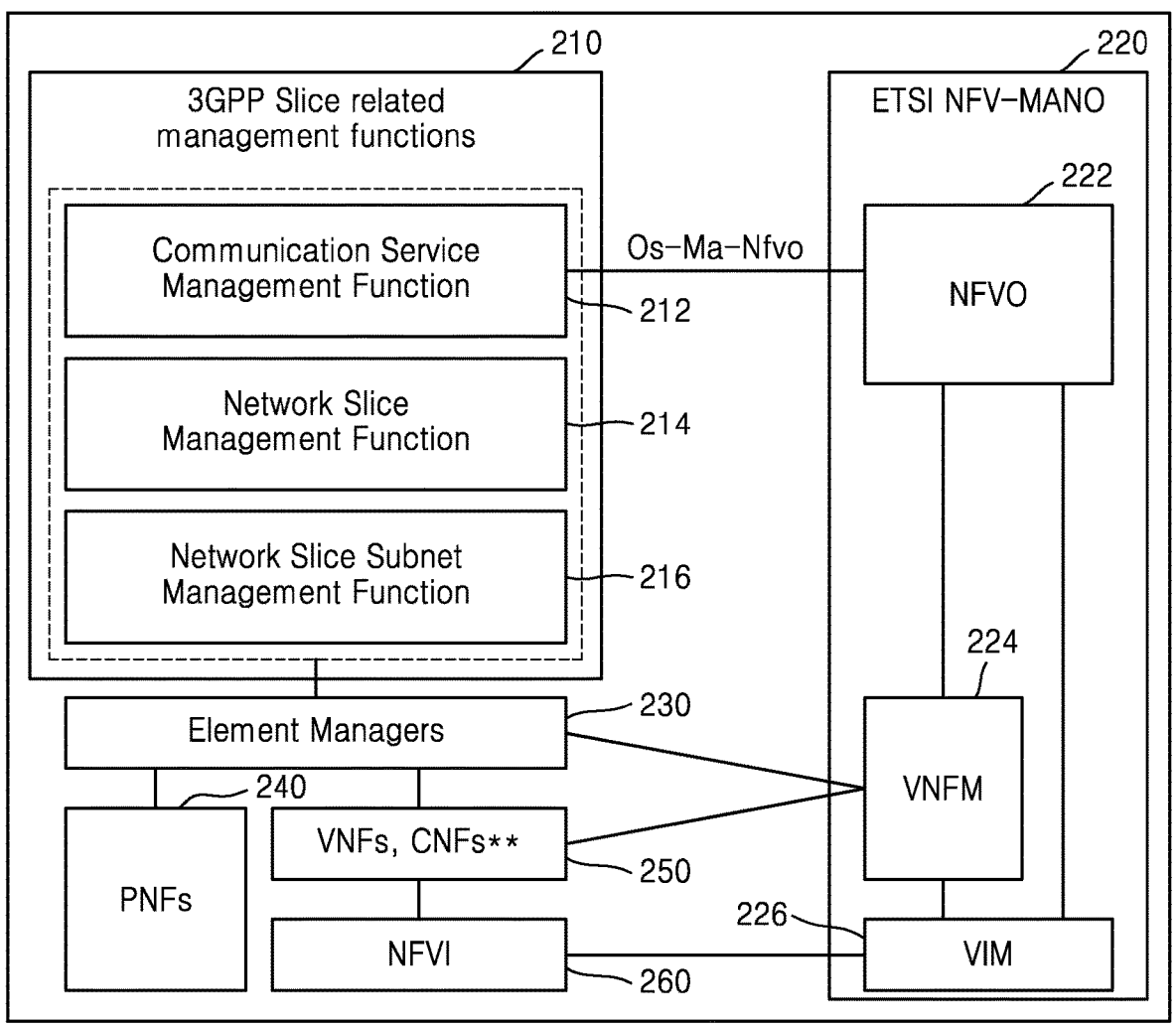
FIG. 2 is a schematic diagram showing a management structure between a 3$^{rd}$ Generation Partnership Project (3GPP) environment and a network functions virtualization management and orchestration (NFV-MANO) according to an embodiment of the disclosure.

FIG. 2 is a schematic diagram showing a management structure between a 3GPP environment and a network functions virtualization management and orchestration (NFV-MANO) according to an embodiment of the disclosure.

Referring to FIG. 2, a 3GPP management system may employ an ETSI NFV-MANO system to include a comprehensive management system structure and interfaces to which network function virtualization is applied in a mobile environment. In an embodiment, a communication system may include a 3GPP slice related management functions block 210, an ETSI NFV-MANO block 220, element managers 230, physical network functions (PNFs) 240, virtualized network functions (VNFs) and cloud native network functions (CNFs) 250, and a network function virtualization infrastructure (NFVI) 260. In an embodiment, the 3GPP slice related management functions block 210 may include a communication service management function (CSMF) 212, a network slice management function (NSMF) 214, and a network slice subnet management function (NSSMF) 216.

The ETSI NFV-MANO block 220 may include a network function virtualization orchestrator (NFVO) 222, a virtualized network function manager (VNFM) 224, and a virtualized infrastructure manager (VIM) 226. The NFVO 222 may automatically deploy and manage network services. The VNFM 224 is in charge of assignment, scheduling, management, and orchestration of virtual resources, and may manage life cycles of the VNFs. The VIM 226 may provide an interface for higher layer software, and manage life cycles of, schedule, assign, load, or upgrade virtual resources.

In an embodiment, the element managers 230 may manage life cycles of network elements or NFs. For example, the element managers 230 may instantiate, update, or remove the NFs.

In an embodiment, the NFVI 260 is a resource group used to host and connect the VNFs, and may be a cloud data center including a server, a virtualized management program, an operating system, a virtual machine, a virtual switch, and network resources.

Various scenarios and requirements for performing network management through Os-Ma-Nfvo between the CSMF 212 and the NFVO 222 and an interface between the element managers 230 and the VNFM 224 are being actively derived. In a process of standardizing network slicing, network slice deployment and a runtime environment may be determined by the 3GPP slice related management functions block 210 connected to the ETSI NFV-MANO block 220 including the NFVO 222, the VNFM 224, and the VIM 226. As such, an orchestrator may be in charge of overall management of target entities. That is, the orchestrator may provide necessary information in the form of a descriptor for appropriate operations of the target entities. For example, in the ETSI NFV-MANO block 220, the orchestrator may provide a network service by using an NSD as an input. As another example, in the 3GPP slice related management functions block 210, the orchestrator may provide a network slice by using an NSLD as an input. However, a method of automatically generating an NSLD, a method of automatically generating an NSD with reference to the NSLD, etc. are not specified and thus are required.

Figure 3:
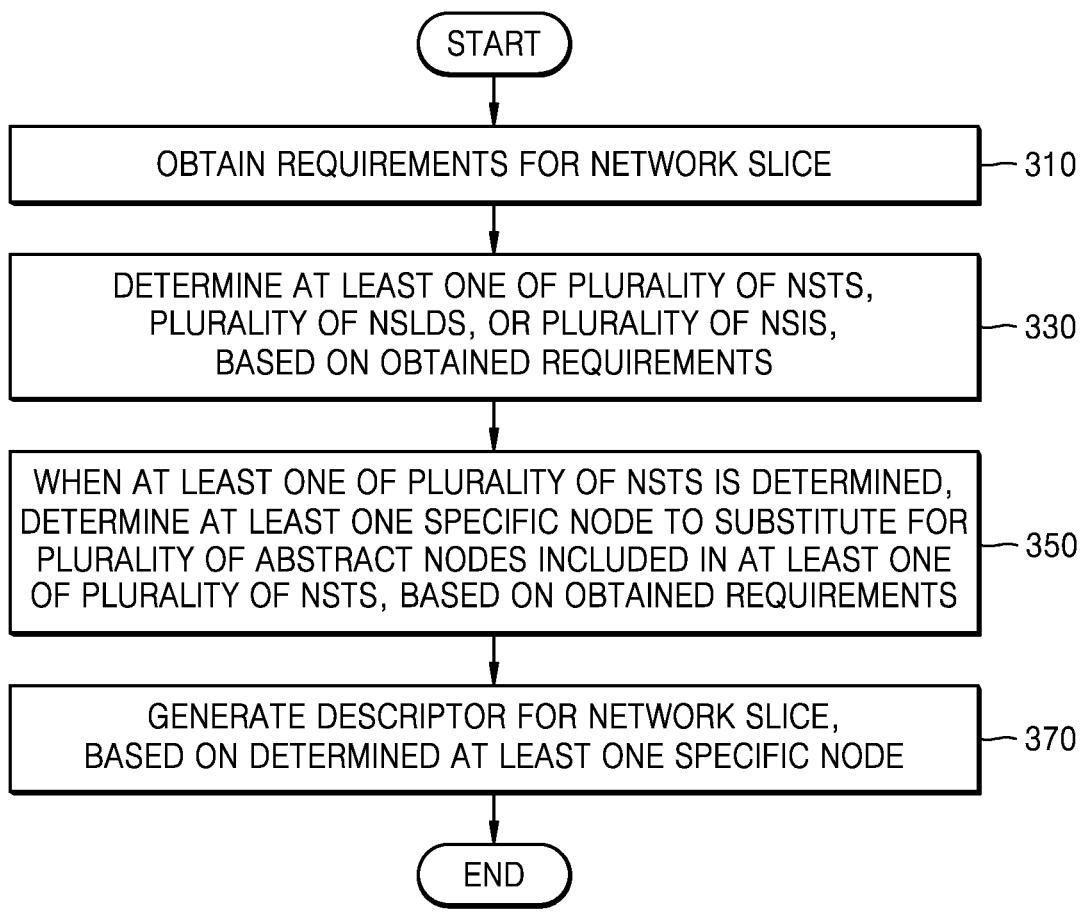
FIG. 3 is a flowchart of a method of generating a descriptor for a network slice, according to an embodiment of the disclosure.

FIG. 3 is a flowchart of a method of generating a descriptor for a network slice, according to an embodiment of the disclosure.

Referring to FIG. 3, in operation 310, an electronic device may obtain requirements for a network slice. In an embodiment, the requirements for a network slice may include a descriptor of a service level agreement (SLA). In addition, the requirements for a network slice may include requirements related to service provider preference, latency, a bandwidth, coverage, functions, a service type, subscription information, a cost of equipment, a shared frequency, etc., but are not limited thereto. For example, the electronic device may obtain the requirements for a network slice of a communication service from a CSMF. As another example, the electronic device may obtain the requirements for a network slice by receiving a user input from a user.

In operation 330, the electronic device may determine at least one of a plurality of NSTs, a plurality of NSLDs, or a plurality of NSIs, based on the obtained requirements. In an embodiment, the electronic device may select one of the plurality of NSTs, the plurality of NSLDs, or the plurality of NSIs, which best meets the obtained requirements.

In an embodiment, the electronic device may determine a first candidate including at least one NST satisfying a preset first criterion from among the plurality of NSTs, determine a second candidate including at least one NSLD satisfying a preset second criterion from among the plurality of NSLDs, determine a third candidate including at least one NSI satisfying a preset third criterion from among the plurality of NSIs, determine a matching score between the requirements obtained in operation 310 and each of the NST, the NSLD, and the NSI respectively included in the first, second, and third candidates, and determine at least one having a highest matching score from among the NST, the NSLD, and the NSI respectively included in the first, second, and third candidates, as the at least one of the plurality of NSTs, the plurality of NSLDs, or the plurality of NSIs. For example, the matching score may be determined based on similarity between the obtained requirements and each of the NST, the NSLD, and the NSI respectively included in the first, second, and third candidates. As another example, the matching score may be set in such a manner that a candidate having a higher similarity within a cost limitation set by a service provider has a higher matching score even when the candidate does not have the highest similarity.

In another embodiment, the electronic device may select at least one of an NST, an NSLD, and/or an NSI corresponding to a first requirement of the obtained requirements, and select at least one of the selected NST, NSLD, and/or NSI, which best meets the requirements 510, based on the first requirement. For example, the first requirement may fall into a broad category such as a network slice or service type.

In an embodiment, the electronic device may select the at least one NST from an NST repository, based on the first criterion. For example, the first criterion may include an NST type, an NST capacity, or an interface type. The electronic device may select the at least one NSLD from an NSLD repository, based on the second criterion. For example, the second criterion may include an NSLD type, an NSLD capacity, or an interface type. The electronic device may select the at least one NSI from an NSI inventory, based on the third criterion. For example, the third criterion may include an NSI type, an NSI capacity, or an interface type. In an embodiment, the first, second, and third criteria may be identical to each other, partially identical to each other, or different from each other. For example, the electronic device may select a first NST from the NST repository, based on the NST type, select a first NSLD from the NSLD repository, based on the NSLD type, select a first NSI from the NSI inventory, based on the NSI type, determine a matching score between the requirements and each of the first NST, the first NSLD, and the first NSI, and determine one having a high matching score from among the first NST, the first NSLD, and the first NSI. According to an embodiment, the electronic device may reduce the amount of calculation by selecting an NST, an NSLD, or an NSI based on a comprehensive criterion such as a type before a descriptor for a network slice is specified, and generate an optimal descriptor for a network slice by comparing similarity of all candidates. In an embodiment, when the electronic device selects the NSLD or the NSI, operations 350 and 370 may not be performed.

In operation 350, when at least one of the plurality of NSTs is determined, the electronic device may determine at least one specific node to substitute for a plurality of abstract nodes included in the at least one of the plurality of NSTs, based on the obtained requirements. In an embodiment, the plurality of abstract nodes included in the determined at least one of the plurality of NSTs or the plurality of NSIs may include a network slice subnet abstract node, a connectivity abstract node, and a managed function abstract node.

In an embodiment, the electronic device may substitute the network slice subnet abstract node included in the determined at least one of the plurality of NSTs, with a specific node. That is, the electronic device may substitute the network slice subnet abstract node by using specific information. The electronic device may determine at least one of an NSST, an NSLSD, an existing NSSI, an NSD, or an existing network service instance, based on similarity to the obtained requirements, and determine the determined at least one as a specific node to substitute for the network slice subnet abstract node.

In an embodiment, the electronic device may substitute the connectivity abstract node included in the determined at least one of the plurality of NSTs, with a specific node. That is, the electronic device may substitute the connectivity abstract node by using specific information. The electronic device may determine at least one of a virtual link, an NSD, or an existing network service instance, based on similarity to the obtained requirements, and determine the determined at least one as a specific node to substitute for the connectivity abstract node.

In an embodiment, the electronic device may substitute the managed function abstract node included in the determined at least one of the plurality of NSTs, with a specific node. That is, the electronic device may substitute the managed function abstract node by using specific information. The electronic device may determine at least one of an existing managed function, a VNFD, an NSD, a VNF instance, or a network service instance, based on similarity to the obtained requirements, and determine the determined at least one as a specific node to substitute for the managed function abstract node.

In an embodiment, the electronic device may substitute a plurality of abstract nodes included in the determined at least one of the plurality of NSTs, with a part or an entirety of an element included in at least one of an NSST, an NSLSD, an existing NSSI, an NSD, or an existing network service instance, determine whether each of the plurality of abstract nodes is substituted with a part or an entirety of the element satisfying the obtained requirements, when it is determined that each of the plurality of abstract nodes is not substituted with a part or an entirety of the element satisfying the obtained requirements, substitute at least one abstract node determined as not being substituted, with a part or an entirety of at least one element satisfying the obtained requirements, and, when it is determined that all of the plurality of abstract nodes is substituted with a part or an entirety of the element satisfying the obtained requirements, generate the descriptor for a network slice, based on the substituted part or entirety of the at least one element. That is, the electronic device may recursively perform the substitution process until all abstract nodes included in the NST are substituted. In this case, the element may correspond to a specific node.

In operation 370, the electronic device may generate a descriptor for a network slice, based on the determined at least one specific node. In an embodiment, the descriptor for a network slice may include an NSD to be used by an ETSI NFV-MANO orchestrator, or an NSLD or NSLSD to be used by a 3GPP NSMF/NSSMF orchestrator.

In an embodiment, the electronic device may generate an NSLD, based on at least one specific node determined to substitute for the network slice subnet abstract node and the connectivity abstract node. That is, the electronic device may generate the NSLD by using the substituted network slice subnet abstract node and the substituted connectivity abstract node. The electronic device may generate an NSD, based on at least one specific node determined to substitute for the connectivity abstract node and the managed function abstract node. That is, the electronic device may generate the NSD by using the substituted connectivity abstract node and the substituted managed function abstract node.

In an embodiment, the obtained requirements may include a service level agreement, service provider preference, a latency requirement, a bandwidth requirement, UE functions, subscription information, a cost, a service type, etc. The matching score may be determined based on similarity between the obtained requirements and each of the NST, the NSLD, and the NSI respectively included in the first, second, and third candidates.

In an embodiment, the electronic device may store at least one of the NSLD or the NSD, based on the generated new descriptor for a network slice.

Figure 4:
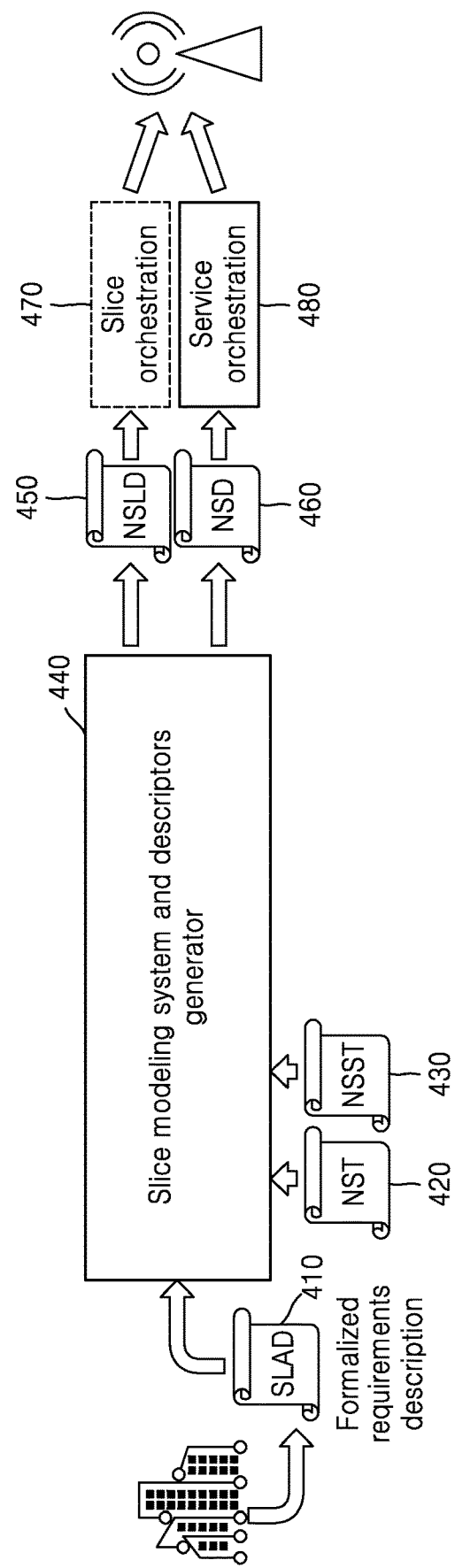
FIG. 4 is a block diagram for describing a method of generating a network slice descriptor (NSLD) and a network service descriptor (NSD), according to an embodiment of the disclosure.

FIG. 4 is a block diagram for describing a method of generating an NSLD and an NSD, according to an embodiment of the disclosure.

Referring to FIG. 4, a slice modeling system and descriptors generator 440 may generate an NSLD 450 by using a service level agreement descriptor (SLAD) 410, an NST 420, and an NSST 430. Alternatively, the slice modeling system and descriptors generator 440 may generate an NSD 460 together with the NSLD 450. In an embodiment, the NSLD 450 may be used by a slice orchestrator 470, and the NSD 460 may be used by a service orchestrator 480.

In an embodiment, the slice modeling system and descriptors generator 440 may obtain the SLAD 410 as requirements for a network slice, and select at least one of a plurality of NSTs 420 or a plurality of NSSTs 430, which is most similar to the obtained requirements, based on the obtained requirements. The slice modeling system and descriptors generator 440 may determine at least one of a plurality of NSIs or a plurality of NSLDs in addition to the plurality of NSTs 420 or the plurality of NSSTs 430, which meets the obtained requirements, based on the obtained requirements. That is, the slice modeling system and descriptors generator 440 may select at least one which meets the obtained requirements, based on similarity between the obtained requirements and each of elements included in a set including the plurality of NSTs 420, the plurality of NSSTs 430, the plurality of NSIs, and the plurality of NSLDs. For example, the slice modeling system and descriptors generator 440 may determine at least one which is most similar to the obtained requirements. As another example, the slice modeling system and descriptors generator 440 may select one which is not most similar to the obtained requirements but is optimal in consideration of a cost or the like.

In an embodiment, the slice modeling system and descriptors generator 440 may identify a plurality of abstract nodes included in the at least one of the NSTs 420, the plurality of NSSTs 430, the plurality of NSIs, or the plurality of NSLDs, which is determined based on the obtained requirements. For example, the plurality of abstract nodes may include a network slice subnet abstract node, a connectivity abstract node, and a managed function abstract node. The slice modeling system and descriptors generator 440 may substitute each of the identified plurality of abstract nodes with a specific node. For example, the slice modeling system and descriptors generator 440 may determine at least one of an NSST, an NSLSD, an existing NSSI, an NSD, or an existing network service instance, which meets the obtained requirements, based on similarity to the obtained requirements, and determine the determined at least one as at least one specific node to substitute for at least one network slice subnet abstract node. As another example, the slice modeling system and descriptors generator 440 may determine at least one of a virtual link, an NSD, or an existing network service instance, which meets the obtained requirements, based on similarity to the obtained requirements, and determine the determined at least one as at least one specific node to substitute for at least one connectivity abstract node. As still another example, the slice modeling system and descriptors generator 440 may determine at least one of an existing managed function, a VNFD, an NSD, a VNF instance, or a network service instance, which meets the obtained requirements, and determine the determined at least one as at least one specific node to substitute for at least one managed function abstract node.

In an embodiment, the slice modeling system and descriptors generator 440 may substitute each of the plurality of abstract nodes with a specific node and, when at least one of the plurality of abstract nodes is not substituted, recursively perform the substitution process until all of the plurality of abstract nodes are substituted. When it is determined that all of the plurality of abstract nodes are substituted with specific nodes, the slice modeling system and descriptors generator 440 may generate a descriptor for a network slice, based on the specific nodes substituted for the plurality of abstract nodes. That is, the slice modeling system and descriptors generator 440 may generate the NSLD 450 for the slice orchestrator 470, and the NSD 460 for the service orchestrator 480. That is, the descriptor for a network slice may include the NSLD 450 and the NSD 460.

Figure 5:
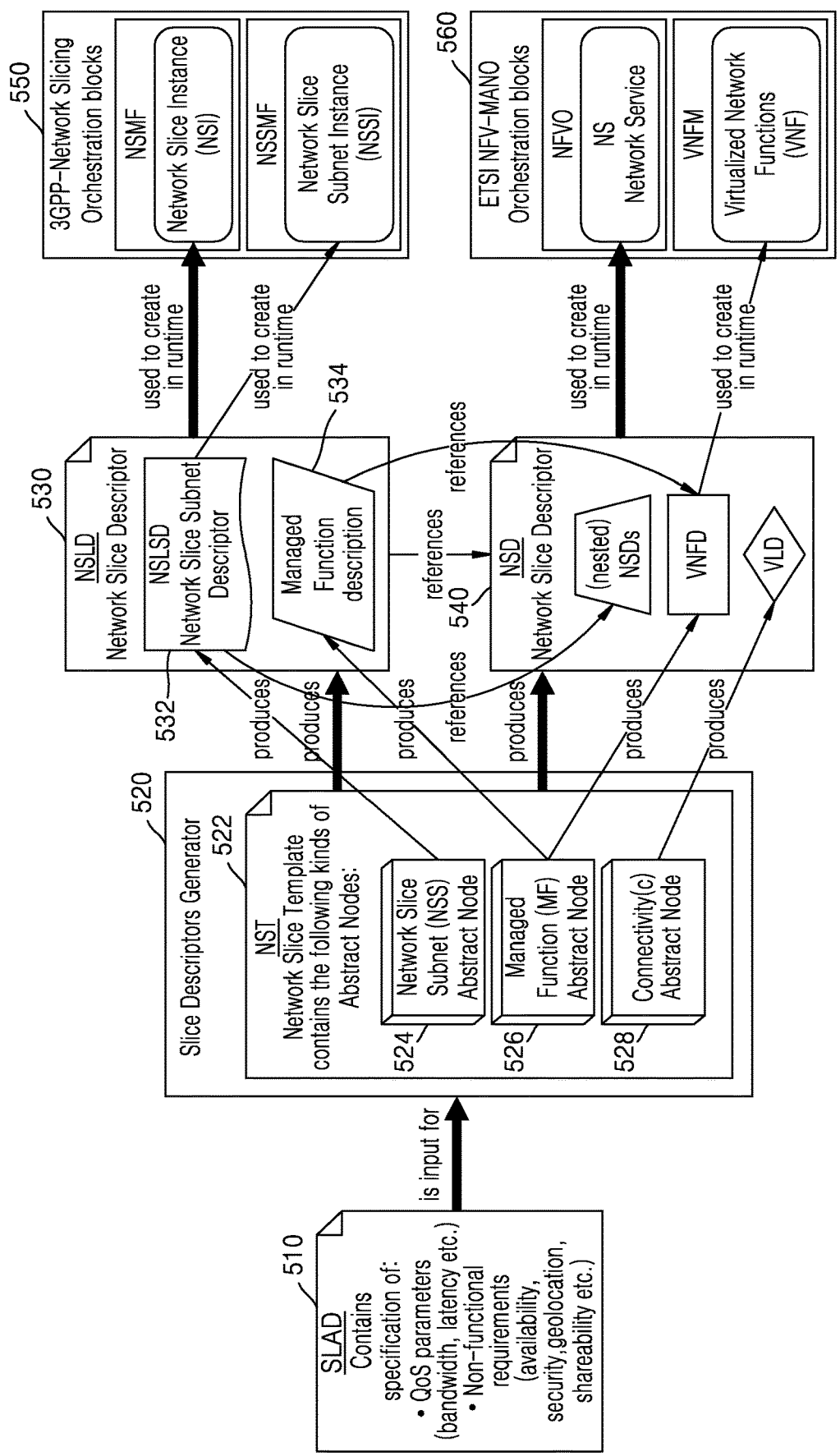
FIG. 5 is a block diagram for describing a method of generating a network slice by generating an NSLD and an NSD, according to an embodiment of the disclosure.

FIG. 5 is a block diagram for describing a method of generating a network slice by generating an NSLD and an NSD, according to an embodiment of the disclosure.

Referring to FIG. 5, a slice descriptors generator 520 may obtain requirements 510 for a network slice, and generate at least one of an NSLD 530 or an NSD 540, based on the obtained requirements 510 for a network slice. For example, the requirements 510 for a network slice may include an SLAD. The requirements 510 for a network slice may include requirements related to quality of service (QoS) parameters, e.g., an SLAD, a bandwidth, and latency, and non-functional requirements, e.g., availability, security, geolocation, and shareability. In an embodiment, the requirements 510 for a network slice may include a combination of requirements according to a 3GPP service profile and requirements according to a GSM Association (GSMA) generic network slice template (GST).

In an embodiment, the slice descriptors generator 520 may determine at least one of a plurality of NSTs, a plurality of NSLDs, or a plurality of NSIs, based on the obtained requirements 510. For example, the slice descriptors generator 520 may determine at least one of the plurality of NSTs, the plurality of NSLDs, or the plurality of NSIs, based on similarity to the obtained requirements 510. For example, the slice descriptors generator 520 may determine a first candidate including at least one NST satisfying a preset first criterion from among the plurality of NSTs, determine a second candidate including at least one NSLD satisfying a preset second criterion from among the plurality of NSLDs, determine a third candidate including at least one NSI satisfying a preset third criterion from among the plurality of NSIs, determine a matching score between the obtained requirements 510 and each of the NST, the NSLD, and the NSI respectively included in the first, second, and third candidates, and determine at least one having the highest matching score. As another example, the slice descriptors generator 520 may select at least one of an NST, an NSLD, and/or an NSI corresponding to a first requirement of the obtained requirements 510, and select at least one of the selected NST, NSLD, and/or NSI, which best meets the requirements 510, based on the first requirement. In this case, the first requirement may fall into a broad category such as a type of network slice or a type of communication service to be provided.

In an embodiment, the slice descriptors generator 520 may determine a first NST 522 as the one having the highest matching score. The first NST 522 may include a network slice subnet abstract node 524, a managed function abstract node 526, and a connectivity abstract node 528. The first NST 522 may include metadata information, exposed capabilities information, abstract nodes information, and policies information. In an embodiment, the exposed capabilities information may include a set of attributes specifying characteristics of a slice and/or a slice subnet modeled by the first NST 522. That is, the exposed capabilities information may include various sets of attributes depending on the type of the modeled slice and/or slice subnet. The set of attributes may include all or some attributes included in the obtained requirements 510. For example, the set of attributes may include a range of satisfaction of the requirements 510 through comparison between the requirements 510 and elements in the set of attributes when the slice and/or slice subnet is modeled using the first NST 522. In an embodiment, the first NST 522 may include information shown in Table 1.

TABLE 1

| Attribute group | Attribute | Qualifier | Cardinality | Content | Description |
| --- | --- | --- | --- | --- | --- |
| metadata | id | M | 1 | Identifier | id of NST/NSST |
| metadata | name | M | 1 | String | name of NST/NSST |
| metadata | description | O | 1 | String | human readable description of NST/NSST |
| exposed capabilities | type | M | 1 | String/Identifier | Type of Newtork Slice or Network Slice Subnet to be produced by this NST/NSST |
| exposed capabilities | SLA | O | 1 | | SLA capabilities of the slice that the NST describes, such as; latency, total bandwidth, experimental bandwidth, jitter availability |
| exposed capabilities | functional | O | 1 | | functional capabilities of the slice that the NST describes, such as; mobility level (stationary, nomadic, restricted mobility, fully mobility), security level (encryption, archivization, etc.) |
| exposed capabilities | capacity | O | 1 | | capacity capabilities of the slice that the NST describes, such as: session capacity, UE capacity |
| exposed capabilities | coverage | O | 1 | | coverage capabilities of the slice that the NST describes, expressed as: geographical coverage, TAC, LAC, RAC lists |
| exposed capabilities | sharing level | O | 1 | Enum | sharing level of the slice that NST describes, such as: shareable, non-shareable |
| exposed capabilities | operations | O | 0.n | | list of operations supported by the slice that NST describes with associated workflows containing operatons on NST internalenties (Abstract Nodes) |
| abstract nodes | network slice subnets abstract nodes | M | 0.n | AbstractNetworkSliceSubnetNode | represent Network Slice Subnets. To be substitute with matching candidates during Abstract Nodes Substitution process |
| abstract nodes | managed function abstract nodes | M | 0.n | AbstractManagedFunctionNode | represent Managed Functions. To be substitute with matching candidates during Abstract Nodes Substitution process |
| abstract nodes | connectivity abstract nodes | M | 0.n | AbstractConnectivityNode | represent connectivity between Newroks Slice Subnets and Managed Function. To be substitute with matching candidates during Abstract Nodes Substitution process |

TABLE 1-continued

| Attribute group | Attribute | Qualifier | Cardinality | Content | Description |
|---|---|---|---|---|---|
| policies | Performance Management policies | O | 1.n | Rule | list of policies related to Performance Management such as: fomrulas to calculate complex KPISs from collected PM data and KPIs from collected nestes MRs, Subnets. Connectivity Nodes and Network Service, reporting periods, thresholds |
| policies | Fault Management policies | O | 1.n | Rule | list of policies related to Fault managment such as: formulas to generate complex Alarms basing on Alarms ollected from collected nestes MRs, Subnets, Connectivity Nodes and Network Service |

The abstract nodes information about the network slice subnet abstract node 524 in Table 1 may include information shown in Table 2.

TABLE 2

| Attribute group | Attribute | Qualifier | Cardinality | Content | Description |
|---|---|---|---|---|---|
| Metadata | id | M | 1 | Identifier | id of NSS(Network Slice Subnet) |
| Metadata | name | M | 1 | String | name of this NSS |
| Metadata | description | O | 1 | String | human readable description of NSS |
| requirements | Network Slice Subnet type | M | 1 | String/Identifier | required type of NSS according to type hierarchy |
| requirements | SLA requirements | O | 1 | | SLA requirements for the against the NSS, such as: latency, total bandwidth, experimental bandwidth, jitter availability |
| requirements | functional requirements | O | 0.n | | functional requirements for the NSS |
| requirements | capacity requirements | O | 1 | | capacity requirements for the NSS |
| requirements | sharing level requirement | O | 1 | Enum | sharing level requirement for the NSS, such as: shareable, non-shreable |
| requirements | coverage | O | 1 | | coverage capabilities of the slice that the NST describes expressed as: geographical coverage, TAC, LAC, RAC lists |
| requirements | operations | O | 0.n | | list of operations supported by the Slice/Subnet that NSLD/NSLSD describes with associated workflows containing operations on internal entities (Abstract Nodes) |
| policies | Performance Management policies | O | 0.n | Rule | list of PM policies such as: list of KPIs to be collected, reporting periods |
| policies | Fault Management policies | O | 0.n | Rule | list of FM policies such as: list of Alarms to be collected |

The abstract nodes information about the managed function abstract node 526 in Table 1 may include information shown in Table 3.

TABLE 3

| Attribute group | Attribute | Qualifier | Cardinality | Content | Description |
|---|---|---|---|---|---|
| metadata | id | M | 1 | Identifier | id of tide MF(managed function) |
| metadata | name | O | 1 | String | name of this MF |
| metadata | description | O | 1 | String | human readable description of MF |
| requirements | MF type | O | 1 | String/Identifier | required type of MF according to type hierarchy |
| requirements | SLA | O | 1 | | SLA requirements for the MF such as: latency, total bandwidth, experiential bandwidth, jitter, availability |
| requirements | functional | O | 0.n | | functional requirement for the MF |
| requirements | capacity | O | 1 | | capacity requirements for the MF |
| requirements | coverage | O | 1 | | coverage requirements against the MF expressed as: geographical coverage TAC, LAC, RAC lists |
| requirements | sharing level | O | 1 | Enum | sharing level requirement for the MF such as: shareable, non-shareable |

TABLE 3-continued

| Attribute group | Attribute | Qualifier | Cardinality | Content | Description |
|---|---|---|---|---|---|
| requirements | operations | O | 0.n | | list of operations supported by the MF |
| policies | Performance Management policies | O | 0.n | Rule | list of PM policies such as: list of KPIs to be collected, reporting periods |
| policies | Fault Management policies | O | 0.n | Rule | list of FM policies such as: list of Alarms to be collected |
| configuration | abstract application configuration | O | 1 | Yang or Netconf or JSON | application configuration using 3GPP 28.541 attributes |

The abstract nodes information about the connectivity abstract node 528 in Table 1 may include information shown in Table 4.

TABLE 4

| Attribute group | Attribute | Qualifier | Cardinality | Content | Description |
|---|---|---|---|---|---|
| metadata | | M | 1 | Identifier | id of this Connectivity Node |
| metadata | | M | 1 | String | name of this Connectivity Node |
| metadata | | O | 1 | String | human readable description of Connectivity Node |
| requirements | | M | 1 | Number | Specifies the throughput requirement of the link. In order to generate "virtualLinkProfile" "maxBitrateRequirements" attribute wile generating NsD |
| requirements | | M | 1 | Number | Specifies the throughput requirement of the link. In order to generate "virtualLinkProfile" "maxBitrateRequirements" attribute wile generating NsD |
| requirements | | M | 1.N | Enum | Identifiers the protocols that the VL uses (Ethernet, MPLS, ODU2, IPV4, IPV6, Pseudo-Wire). In order to generate "NSD", "NsVirtualLinkDesc". "ConnectivityType" attribute |
| requirements | flowPattern | M | 0.1 | String | Specifies the flow pattern of the connectivity (line, Tree, Mesh, etc.). In order to generate "NSD", "NsVirtualLinkDesc", "ConnectivityType" attribute |
| requirements | latency | M | 1 | Number | Specifies the maximum latency in ms. In order to generate "NSD", "NsVirtualLinkDesc", "VirtualLinkDf", "QoS" attribute |
| requirements | packetDelayVariation | M | 1 | Number | Specifies the maximum jitter in ms. In order to generate "NSD", "NsVirtualLinkDesc", "VirtualLinkDf", "QoS" attribute |
| requirements | packetLossRatio | M | 0.1 | Number | Specifies the maximum packet loss ratio. In order to generate "NSD", "NsVirtualLinkDesc", "VirtualLinkDf", "QoS" attribute |
| requirements | Priority | M | 0.1 | Integer | Specifies the priortiy level in case of congestion on the underlying physical links. In order to generate "NSD", "NsVirtualLinkDesc", "VirtualLinkDf", "QoS" attribute |
| requirements | capacity requirements | O | 1 | Number | capacity requirements for the Connectivity Node |
| requirements | sharing level requirements | O | 2 | Enum | sharing level requirement for the Connectivity Node, such as: shareable, non-shareable |
| policies | Performance Managment policies | O | 0.n | Rule | list of PM policies such as: list of KPIs to be collected, reporting periods |
| policies | Fault Managment policies | O | 0.n | Rule | list of FM policies such as: list of Alarms to be collected |

In an embodiment, to substitute the network slice subnet abstract node 524, the slice descriptors generator 520 may select at least one of an NSST, an NSLSD, an existing NSSI, an NSD, or an existing network service instance, based on similarity to the requirements 510 for a network slice. The slice descriptors generator 520 may substitute at least one network slice subnet abstract node 524 by using the selected at least one. In an embodiment, to substitute the connectivity abstract node 528, the slice descriptors generator 520 may select at least one of a virtual link, an NSD, or an existing network service instance, based on similarity to the requirements 510 for a network slice. The slice descriptors generator 520 may substitute at least one connectivity abstract node 528 by using the selected at least one. In an embodiment, to substitute the managed function abstract node 526, the slice descriptors generator 520 may select at least one of an existing managed function, a VNFD, an NSD, a VNF instance, or a network service instance, based on similarity to the requirements 510 for a network slice. The slice descriptors generator 520 may substitute at least one managed function abstract node 526 by using the selected at least one. In an embodiment, the substitution process may include a process of filling specific information in the abstract nodes included in the template.

In an embodiment, the slice descriptors generator 520 may generate the NSLD 530 by using the substituted at least one network slice subnet abstract node and the substituted at least one managed function abstract node. In addition, the slice descriptors generator 520 may generate the NSD 540 by using the substituted at least one managed function abstract node and the substituted at least one connectivity abstract node.

In an embodiment, the NSLD 530 may include an NSLSD 532, a managed function description 534, metadata, reference information to be provided to an ETSI NFV-MANO management entity, exposed capabilities information, requirements information about elements substituted for the abstract nodes, internal nodes information, and policies information. The NSLSD 532 may be generated based on the network slice subnet abstract node 524 of the first NST 522. The managed function description 534 may be generated based on the managed function abstract node 526 of the first NST 522.

In an embodiment, the NSLD 530 and the NSLSD 532 may include information shown in Table 5.

TABLE 5

| Attribute group | Attribute | Qualifier | Cardinality | Content | Description |
|---|---|---|---|---|---|
| metadata | reference to origin NST/NSST | O | 1 | Identifier | reference to the NST/NSST that was used to create this NSLD/NSLSD |
| metadata | id | M | 1 | Identifier | id of this NSLD/NSLSD |
| metadata | name | O | 1 | String | name of this NSLD/NSLSD |
| metadata | type | M | 1 | String/Identifier | Type of Network Slice or Network Slice Subnet described by this NSLD/NSLSD |
| metadata | description | O | 1 | String | human readable description of this NSLD/NSLSD |
| reference | nsReference | M | 0.1 | Identifier | reference to MANO-managed or standalone entity that is associated with this NSLD/NSLSD, such as: NSD ID, NS Instance ID |
| reference | nsInfo | M | 0.n | NsInfo | full or partial content of nsInfo attribute (ETSI GS NFV-IFA V3.21 (2019 Apr.), Section 8.3.3) that describes deployment configuration of of Network Service |
| exposed capabilities | SLA | O | 1 | | SLA capabilities of the slice/subnet that the NSLD/NSLSD describes, such as: latency, total bandwitdth, experimental bandwidth, jitter availability |
| exposed capabilities | functional | O | 0.n | | functional capabilities of the slice that the NSLD describes, such as: mobility level, slice type (eMBB, URRLC, mIoT V2X etc) |
| exposed capabilities | capacity | O | 1 | | capacity capabilities of the slice that the NSLD describes, express as: session capacity, UE capacity |
| exposed capabilities | coverage | O | 1 | | coverage capabilities of the slice that the NSLD describes, express as: geographical coverage, TAC, LAC, RAC lists |
| exposed capabilities | sharing level | O | 1 | Enum | sharing level of the slice that NSLD describes, such as: shareable, non-shareable |
| exposed capabilities | operations | O | 0.1 | | list of operations supported by the slice that NSLD describrs with associated workflows cortaining operations on NSLD internal entitites |
| configured requirements | SLA | O | 1 | | SLA requirements against the slice/subnet that the NSLD/NSLSD describes, such as: latency, total bandwitdth, experimental bandwidth, jitter availability |
| configured requirements | functional | O | 0.n | | functional requirements against the slice that the NSLD/NSLSD describes, such as: mobility level, slice type (eMBB, URRLC, mIoT, V2X etc) |
| configured requirements | capacity | O | 1 | | capacity requirements against the slice that the NSLD/NSLSD describes, express as: session capacity, UE capacity |
| configured requirements | coverage | O | 1 | | coverage requirements against the slice that the NSLD/NSLDS describes, expressed as: geographical coverage, TAC, LAC, RAC lists |
| configured requirements | sharing level | O | 1 | Enum | sharing level of the slice that NSLD describes, such as: shareable, non-shareable |
| configured requirements | operations | O | 0.1 | | list of operations supported by the slice that NSLD describrs with associated workflows cortaining operations on NSLD internal entitites |
| internal nodes | Managed Function | M | 0.n | ManagedFunction | list or managed function present in NSLD structure provided in a separate table |
| internal nodes | Connectivity node | M | 0.n | Connectivity | list of Connectivity nodes in NSLD structure provided in a separate table |
| internal nodes | Nested Network Slice Subnet Descriptor (NSLSD) IDs | M | 0.n | Identifier | list of nested Network Slice Subnets structure provided in a separate table |
| policies | Performance Management policies | O | 1.n | Rule | list of policies related to Performance Management such as: formulas calculate complex KPIs from collected PM data and KPIs from collected nestes MFs, Subnets, Connectivity Nodes and Network Service, reporting periods, thresholds |

TABLE 5-continued

| Attribute group | Attribute | Qualifier | Cardinality | Content | Description |
| --- | --- | --- | --- | --- | --- |
| policies | Fault Management policies | O | 1.n | Rule | list of policies related to Fault Management such as: formulas to generate complex Alarms basing on Alarms collected from collected nestes MFs, Subnets, Connectivity Nodes and Network Service |

In an embodiment, the managed function description 534 included in the NSLD 530 may include information shown in Table 6.

TABLE 6

| Attribute group | Attribute | Qualifier | Cardinality | Content | Description |
| --- | --- | --- | --- | --- | --- |
| metadata | id | M | 1 | Identifier | id of this MF |
| metadata | name | O | 1 | String | name of this MF |
| metadata | description | O | 1 | String | human readable description of MF |
| metadata | MF type | O | 1 | String/Identifier | type of MF according to type hierarchy |
| reference | referencedManoEntity | M | 1 | Identifier | reference to MANO-managed or standalone entity that is associated with this MF, such as: NSD ID, NS Instance ID, VNFD ID, VNF Instance ID, PNFD, PNF Instance ID, Physical element IP address |
| reference | NsInfo or VnfInfo | O | 1 | NsInfo or VnfInfo | full or partial content of nsInfo attribute (ETSI GS NFV-IFA 013 V3.2.1 (2019 Apr.), Section 8.3.3) that describes deployment configuration of Network Service or full or partial content of vnfInfo attribute (ETSI GS NFV-IFA 007 V3.3.1 (2019 Jul.), Section 8.5.2) that describes deployment configuration of a Virtualized Network Function |
| obtained capabilities | SLA obtained capabilities | O | 1 | | SLA capabilities of the referenced entity, such as: latency, total bandwidth, experiential bandwidth, jitter, availability |
| obtained capabilities | functional obtained capabilities | O | 0.n | | functional capabilities of the referenced entity |
| obtained capabilities | capacity obtained capability | O | 1 | | capacity capabilities of the referenced entity |
| obtained capabilities | coverage obtained capability | O | 1 | | coverage capabilities of the MF expressed as: geographical coverage, TAC, LAC, RAC lists |
| obtained capabilities | sharing level obtained capability | O | 1 | Enum | sharing level capability of the referenced entity such as: shareable, non-shareable |
| obtained capabilities | operations obtained capability | O | 0.n | | list of operations supported by the MF |
| configured requirements | SLA configured requirements | O | 1 | | SLA requirements for the MF, such as: latency, total bandwidth, experimenial bandwidth, jitter, availability |
| configured requirements | functional configured requirements | O | 0.n | | functional requirements for the MF |
| configured requirements | capacity configured requirements | O | 1 | | capacity requirements for the MF |
| configured requirements | coverage configured requirements | O | 1 | | coverage requirements against the MF expressed as: geographical coverage TAC, LAC, RAC lists |
| configured requirements | sharing level configured requirements | O | 1 | Enum | sharing level requirement for the referenced entity such as: shareable, non-shareable |
| configured requirements | operations configured requirements | O | 0.n | | list of operations required to be supported by the MF |
| policies | Performance Management policies | O | 0.n | Rule | list of PM policies such as :list of KPIs to be collected, reporting periods |
| policies | Fault Management policies | O | 0.n | Rule | list of FM policies such as: list of Alarms to be collected |
| configuration | application configuration | O | 1 | Yang or Netconf or JSON | application configuration using 3GPP 28.541 attributes, potentially supplemented with deployment and vendor-specific configurations |

In an embodiment, the internal nodes information included in the NSLD 530 may include connectivity information between internal nodes. The connectivity information may include information shown in Table 7.

TABLE 7

| Attribute group | Attribute | Qualifier | Cardinality | Content | Description |
|---|---|---|---|---|---|
| metadata | id | M | 1 | Identifier | id of this Connectivity |
| metadata | name | M | 1 | String | name of this Connectivity |
| metadata | description | O | 1 | String | human readable description of Connectivity |
| reference | referencedManoEntity | M | 1 | Identifier | Reference to MANO-managed entity that is associated with this Connectivity, such as: concrete VLD inside of a NSD, VL instance deployed inside of NS instance, nested NSD in the main NS, nested NS instance in the main NS |
| configured requirements | maxBitrateRequirement | M | 1 | Number | Specifies the throughout requirement of the link. |
| configured requirements | minBitrateRequirement | M | 1 | Number | Specifies the throughout requirement of the link. |
| configured requirements | layerProtocolRequirement | M | 1.N | Enum | Identifies the protocols that the VL requires to use (Ethernet, MPLS, ODU2, IPPV4, IPV6, Pseudo-Wire). |
| configured requirements | flowPatternRequirement | M | 0.1 | String | Identifies the required flow pattern of the connectivity (Line, Tree, Mesh, etc.). |
| configured requirements | latencyRequirement | M | 1 | Number | Specifies the maximum latency requirement in ms. |
| configured requirements | packetDelayVariationRequirement | M | 1 | Number | Specifies the maximum jitter requirement in ms. |
| configured requirements | packetLossRatioRequirement | M | 0.1 | Number | Specifies the maximum packet loss ratio requirement. |
| configured requirements | PriorityRequirement | M | 0.1 | Integer | Specifies the required priority level in case of congestion on the underlying physical links. |
| configured requirements | capacityRequirement | O | 1 | Number | capacity requirements for this Connectivity |
| configured requirements | sharingLevelRequirement | O | 1 | Enum | sharing level requirement for this Connectivity such as: shareable, non-shareable |
| obtained capabilities | maxBitrateCapability | M | 1 | Number | Specifies the throughout capability of the link. |
| obtained capabilities | minBitrateCapabtlity | M | 1 | Number | Specifies the throughout capability of the link. |
| obtained capabilities | layerProtocolCapability | M | 1.N | Enum | Identifies the protocols that the VL is capable to use (Ethernet, MPLS, ODU2, IPV4, IPV6, Pseudo-Wire). |
| obtained capabilities | flowPatternCapability | M | 0.1 | String | Identifies the available flow pattern of the connectivity (Line, Tree, Mesh, etc.). |
| obtained capabilities | latencyCapability | M | 1 | Number | Specifies the maximum latency capability in ms. |
| obtained capabilities | packetDelayVariationCapability | M | 1 | Number | Specifies the maximum jitter capability in ms. |
| obtained capabilities | packetLossRatioCapability | M | 0.1 | Number | Specifies the maximum packet loss ratio capability. |
| obtained capabilities | PriorityCapability | M | 0.1 | Integer | Specifies the priority level capability in case of congestion on the underlying physical links |
| obtained capabilities | capacityCapability | O | 1 | Number | capacity capability for this Connectivity |
| obtained capabilities | sharingLevelCapability | O | 1 | Enum | sharing level capability for this Connectivity such as: shareable, non-shareable |
| policies | Performance Management policies | O | 0.n | Rule | list of PM policies such as: list of KPIs to be collected, reporting periods |
| policies | Fault Management policies | O | 0.n | Rule | list of FM policies such as: list of Alarms to be collected |

In an embodiment, the NSD 540 may include nested NSDs, a VNFD, and a VLD. The NSD 540 may be generated with reference to the generated NSLD 530. For example, the nested NSDs may be generated with reference to the NSLSD 532 of the NSLD 530. The VNFD may be generated based on the managed function abstract node 526 of the first NST 522. The VNFD may be generated with reference to the managed function description 534 of the NSLD 530. The VLD may be generated based on the connectivity abstract node 528 of the first NST 522.

In an embodiment, the slice descriptors generator 520 may specify the abstract nodes 524, 526, and 528 with elements, and generate the NSLD 530, the NSLSD 532, the NSD 540, the VNFD, and the VLD by using the specified nodes. For example, the slice descriptors generator 520 may generate the NSLSD 532 of the NSLD 530 by using elements substituted for the network slice subnet abstract node 524, generate the managed function description 534 of the NSLD 530 and the VNFD of the NSD 540 by using elements substituted for the managed function abstract node 526, and generate the VLD of the NSD 540 by using elements substituted for the connectivity abstract node 528. The slice descriptors generator 520 may transmit the generated descriptors to a service provider who desires to generate a network slice. For example, the slice descriptors generator 520 may transmit the generated descriptors to a 3GPP orchestrator or an ETSI orchestrator.

In an embodiment, the generated NSLD 530 may be used by an NSMF for generating an NSI and an NSSMF for generating an NSSI in 3GPP network slicing orchestration blocks 550. The generated NSD 540 may be used by a NFVO and a VNFM for providing a network service in ETSI NFV-MANO orchestration blocks 560.

Figure 6A:
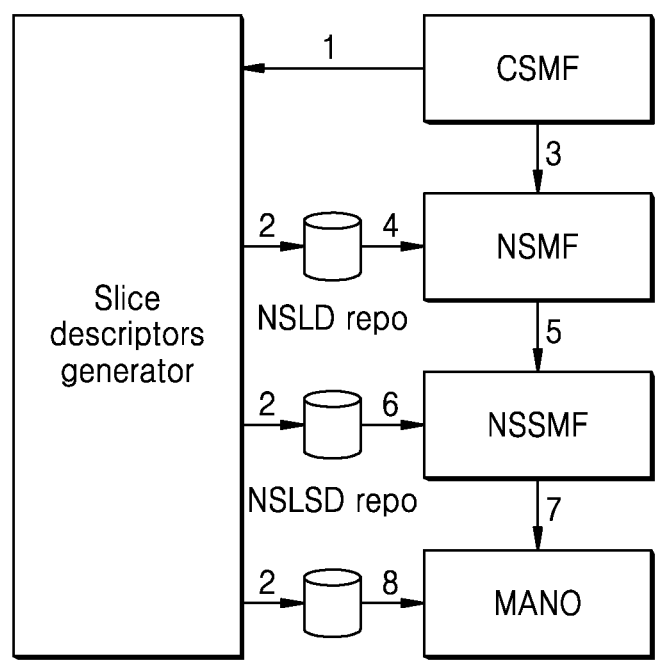
FIGS. 6A and 6B include block diagrams for describing a method of generating an NSLD between a 3GPP environment and a NFV-MANO, according to an embodiment of the disclosure.
Figure 6B:
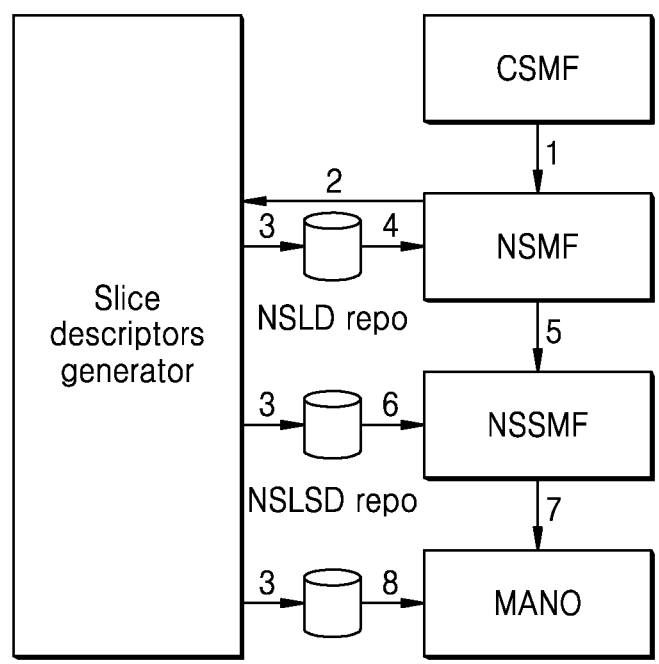

FIGS. 6A and 6B include block diagrams for describing a method of generating an NSLD between a 3GPP environment and a NFV-MANO, according to an embodiment of the disclosure.

In an embodiment, FIG. 6A may be a block diagram for describing a method of generating a slice descriptor before slice generation is requested, and FIG. 6B may be a block diagram for describing a method of generating a slice descriptor in response to a slice assignment request.

Referring to FIG. 6A, a slice descriptors generator may obtain requirements for a network slice from a CSMF (operation 1). The requirements for a network slice which are obtained from the CSMF may include an SLAD. In an embodiment, the slice descriptors generator may select one of an NST, an NSI, or an NSLD satisfying the obtained requirements. For example, when the NSI or NSLD which meets the obtained requirements exists, the slice descriptors generator does not need to generate a new NSLD and may use the existing NSI or NSLD. That is, when a pre-generated NSLD or a running NSI exists, the slice descriptors generator may not generate a new NSLD, and transmit the existing NSLD or NSI to an orchestrator which desires to generate a network slice. As another example, when the NSI or NSLD which meets the obtained requirements does not exist, the slice descriptors generator may generate a new NSLD satisfying the obtained requirements. In an embodiment, when it is determined that the NSI or NSLD satisfying the obtained requirements does not exist, the slice descriptors generator may select an optimal NST by comparing types, exposed capabilities, and/or functions of a plurality of NSTs with the obtained requirements. For example, the slice descriptors generator may select an NST having the highest similarity to the obtained requirements. As another example, the slice descriptors generator may determine an optimal NST from among NSTs having certain levels of similarity to the obtained requirements in consideration of a cost, security, a location, or provider policies although the optimal NST does not have the highest similarity to the obtained requirements. In an embodiment, the slice descriptors generator may substitute a plurality of abstract nodes included in the selected NST with specific nodes based on similarity to the obtained requirements. For example, the specific nodes may include information obtained from an NSST repository, a slice subnet instance inventory, an NSLD repository, an NSD repository, a VNFD repository, or a network service or virtual network function (VNF) instance inventory. The slice descriptors generator may select the specific nodes in consideration of the similarity to the obtained requirements and other elements, and substitute the selected specific nodes for the abstract nodes of the NST. In an embodiment, one abstract node may be substituted with one or more specific nodes. The slice descriptors generator may generate an NSLD and/or an NSD by using the substituted plurality of abstract nodes. That is, the substituted abstract nodes may refer to specified abstract nodes including specific information. The slice descriptors generator may transmit the generated NSLD and/or NSD to an NSLD repository, an NSLSD repository, or an orchestrator. An NSMF may obtain the requirements from the CSMF (operation 3), obtain information of the NSLD generated by the slice descriptors generator (operation 2), from the NSLD repository (operation 4), and proceed a network slice generation process. An NSSMF may obtain information about a network slice to be generated, from the NSMF (operation 5), obtain information of the NSLD generated by the slice descriptors generator (operation 9), from the NSLSD repository (operation 6), identify network slice subnet information, and proceed a network slice generation process, based on the identified information. A MANO may obtain information of the NSD generated by the slice descriptors generator (operations 10 and 8), receive information of a network slice and network slice subnets from the NSSMF (operation 7), and proceed a network slice generation process.

In another embodiment, when it is determined that the NSI or NSLD satisfying the obtained requirements exists, because an NSLD does not need to be generated, the slice descriptors generator may not perform a process of generating an NSLD by substituting the abstract nodes included in the NST, but transmit the selected NSI or NSLD or information indicating the selected NSI or NSLD to the NSMF, the NSSMF, or the MANO to generate a network slice by directly using the selected NSI or NSLD.

Referring to FIG. 6B, the NSMF may obtain requirements for a network slice from the CSMF (operation 3). The NSMF may transmit the obtained requirements to the slice descriptors generator (operation 5). The slice descriptors generator may select an existing NSI or NSLD or generate a new NSLD and/or NSD, based on the requirements obtained from the NSMF. A method of selecting an existing NSI or NSLD or generating a new NSLD and/or NSD may correspond to the method described above with reference to FIG. 6A. The slice descriptors generator may transmit the selected existing NSI, the selected existing NSLD, or the generated NSLD to the NSLD repository, the NSLSD repository, or the MANO (operation 2). The NSMF may perform a network slice generation process, based on the requirements obtained from the CSMF and the information about a network slice obtained from the NSLD repository (operation 4). The NSSMF may perform a network slice generation process, based on the information about a network slice received from the NSMF (operation 5) and the information about network slice subnets obtained from the NSLSD repository (operations 9 and 6). The MANO may perform a network slice generation process, based on the information about a network slice or network slice subnets received from the NSSMF (operation 7), and the NSD received from the slice descriptors generator (operations 10 and 8).

According to an embodiment, the slice descriptors generator may access various amounts of data depending on a level of authority granted by a supported system, and thus generate descriptors configured in various manners. The slice descriptors generator may determine an accurate slice deployment structure by precisely getting all elements in all layers of the NST and the NSST, and thus generate various descriptors for slices to be used in various communication systems. That is, because the slice descriptors generator may use a wide range of data, the accuracy of selecting a network slice may be increased and a network slice generation process may be optimized.

Figure 7:
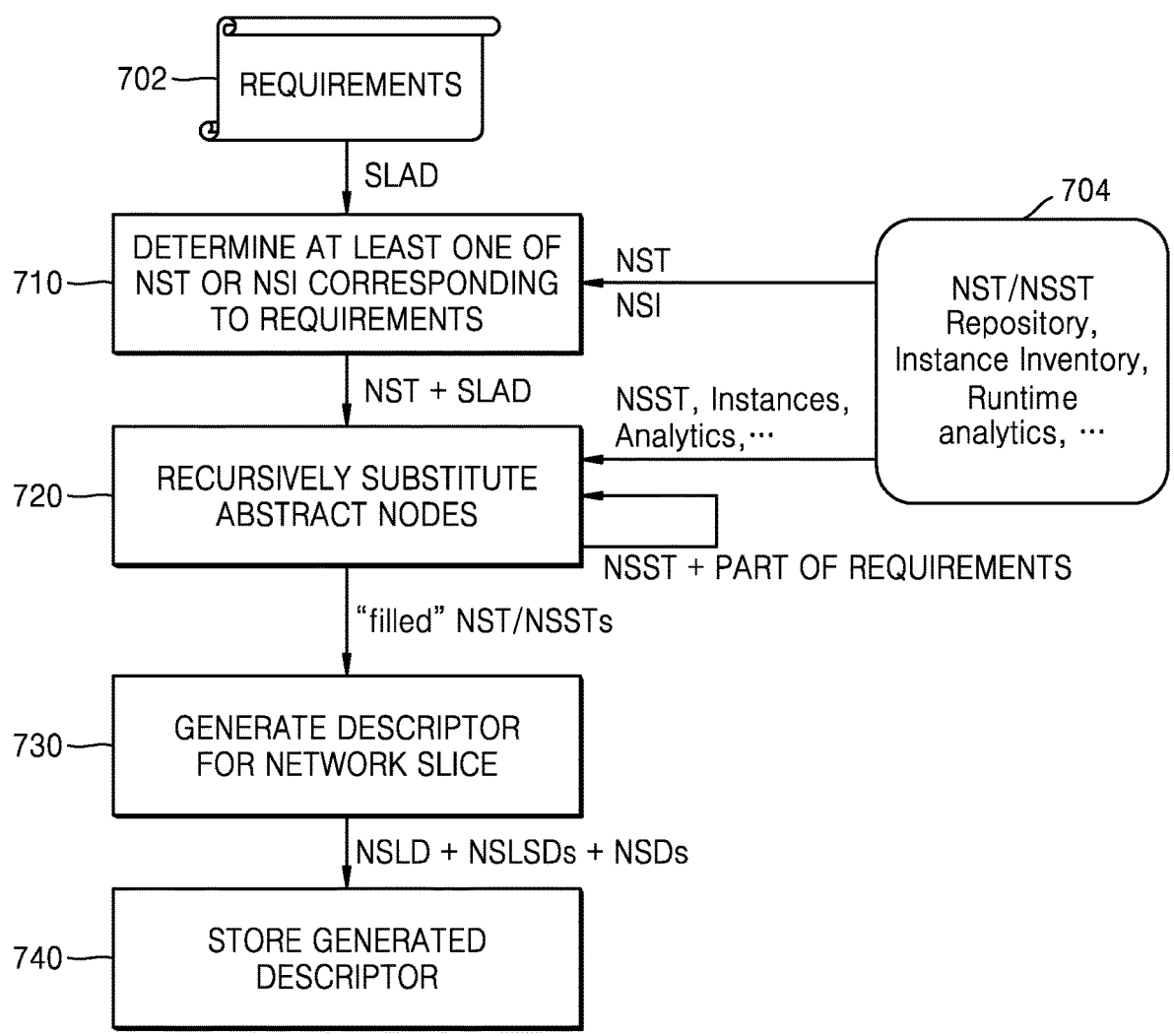
FIG. 7 is a flowchart of a method of generating and storing a descriptor for a network slice, which satisfies requirements, according to an embodiment of the disclosure.

FIG. 7 is a flowchart of a method of generating and storing a descriptor for a network slice, which satisfies requirements, according to an embodiment of the disclosure.

Referring to FIG. 7, in operation 710, an electronic device may determine at least one of an NST or an NSI corresponding to requirements 702. In an embodiment, the electronic device may determine at least one of the NST or the NSI, based on similarity to the requirements 702 and other factors. For example, when an NSI which meets the obtained requirements 702 exists, the electronic device may select the NSI and receive NSI information from an NSI inventory (e.g., NST/NSST repository 704). Because the NSI is used based on the received NSI information, operations 720 to 740 for generating an NSLD may not be performed. As another example, when it is determined that an optimal NST corresponding to the obtained requirements 702 exists, the electronic device may select the optimal NST, obtain the selected NST from an NST/NSST repository 704, and perform operation 720.

In operation 720, when the NST is determined in operation 710, the electronic device may recursively substitute abstract nodes included in the determined NST, by using the determined NST and the requirements 702. In an embodiment, the abstract nodes included in the NST may include a network slice subnet abstract node, a connectivity abstract node, and a managed function abstract node. Each abstract node may include a plurality of abstract nodes. The electronic device may obtain information from an NSST repository, an instance inventory, a runtime analytics, etc., and recursively substitute the abstract nodes included in the NST, to meet the requirements 702. As such, the electronic device may generate a "filled NST/NSSTs." That is, the electronic device may generate an NST in which all of a plurality of abstract nodes are substituted, and one or more NSSTs in which all abstract nodes are substituted.

In operation 730, the electronic device may generate a descriptor for a network slice by using the "filled NST/NSSTs" in which the abstract nodes are substituted. In an embodiment, the descriptor for a network slice may include an NSLD, one or more NSLSDs, and one or more NSDs.

In operation 740, the electronic device may store the generated descriptor. According to an embodiment, by storing the generated descriptor, when other requirements are the same as or similar to the requirements 702, the electronic device may rapidly generate a network slice by using the stored descriptor.

Figure 8:
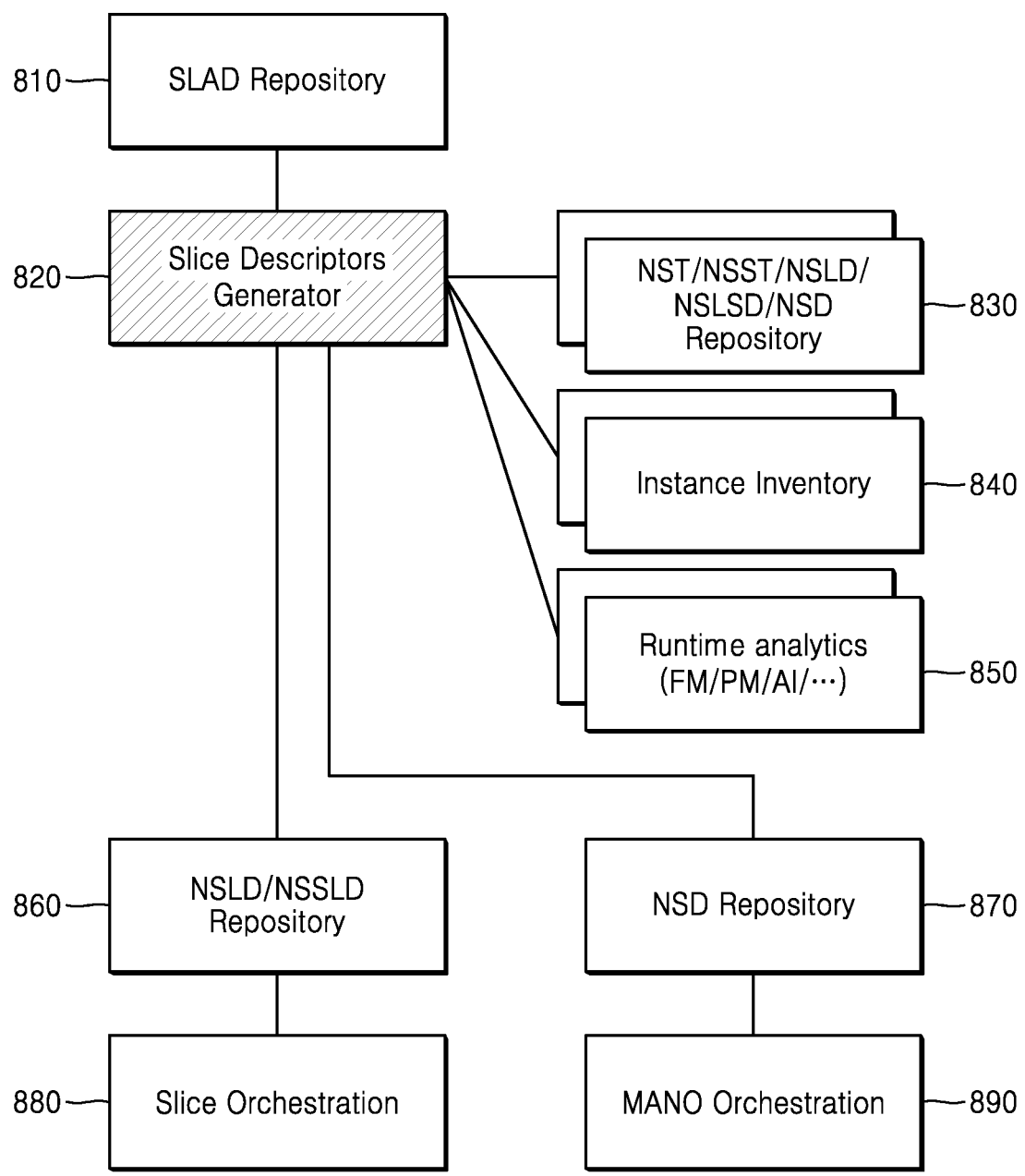
FIG. 8 is a block diagram of apparatuses for generating and storing a descriptor for a network slice, according to an embodiment of the disclosure.

FIG. 8 is a block diagram of apparatuses for generating and storing a descriptor for a network slice, according to an embodiment of the disclosure.

Referring to FIG. 8, an SLAD repository 810 may store requirements for a network slice. For example, the requirements for a network slice may include requirements related to QoS parameters, e.g., an SLAD, a bandwidth, and latency, non-functional requirements, e.g., availability, security, geo-location, and shareability, or requirements according to a combination of a 3GPP service profile and a GSMA GST.

In an embodiment, a slice descriptors generator 820 may generate an NSLD, NSLSDs, and NSDs by obtaining the requirements for a network slice from the SLAD repository 810, obtaining NST/NSST/NSLD/NSLSD/NSD information from an NST/NSST/NSLD/NSLSD/NSD repository 830, obtaining NSI information from an instance inventory 840, and obtaining runtime information from a runtime analytics 850.

In an embodiment, an NSLD/NSLSD repository 860 may store the NSLD and NSLSDs generated by the slice descriptors generator 820. An NSD repository 870 may store the NSDs generated by the slice descriptors generator 820.

A slice orchestrator 880 may obtain the stored NSLD/NSLSDs from the NSLD/NSLSD repository 860, and a MANO orchestrator 890 may obtain the stored NSDs from the NSD repository 870. The slice orchestrator 880 and the MANO orchestrator 890 may cooperate with each other to generate a network slice by using the obtained information.

Figure 9:
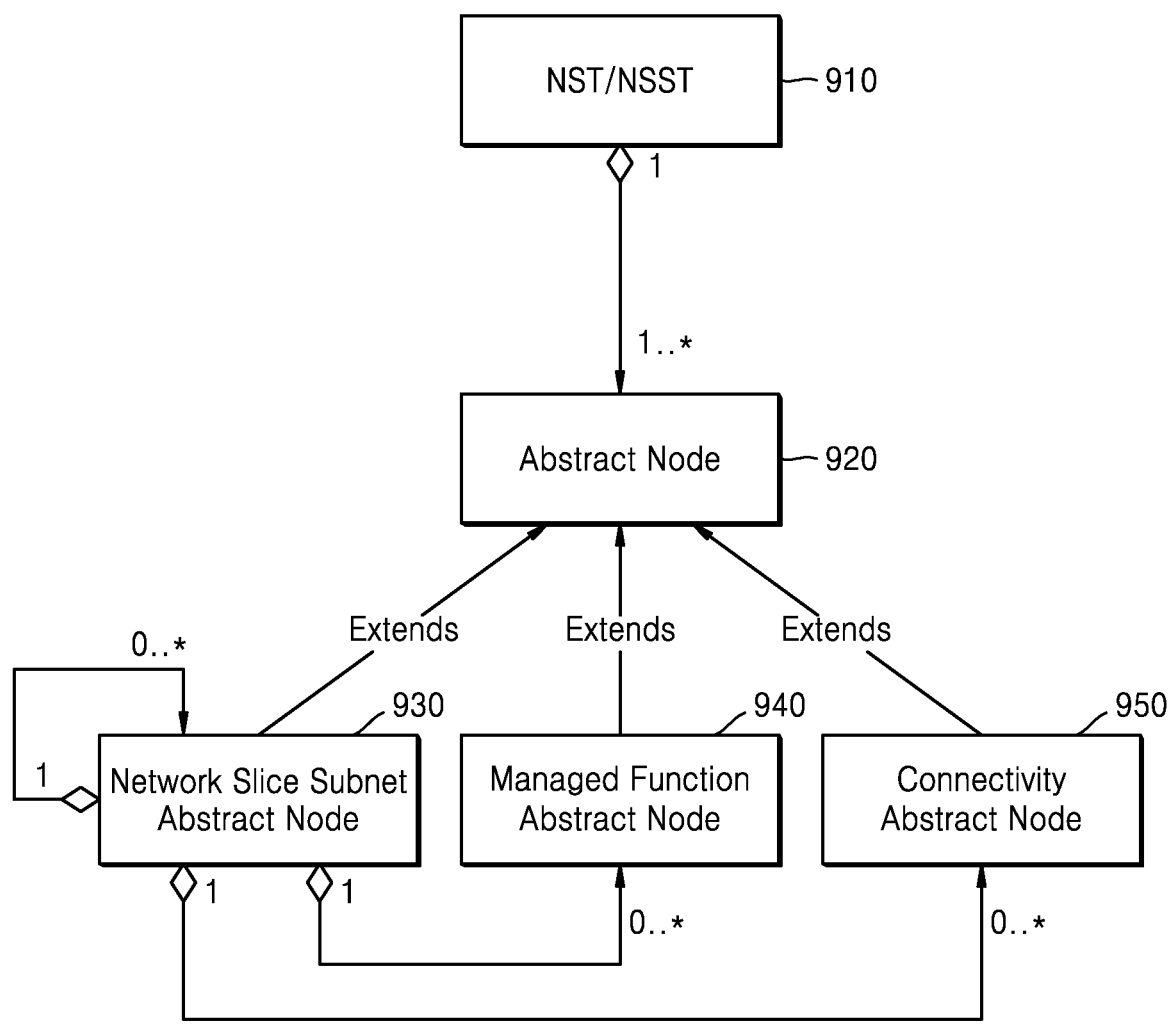
FIG. 9 is a block diagram showing relationships between a network slice template (NST) or a network slice subnet template (NSST), an abstract node, a network slice subnet abstract node, a managed function abstract node, and a connectivity abstract node, according to an embodiment of the disclosure.

FIG. 9 is a block diagram showing relationships between an NST/NSST, an abstract node, a network slice subnet abstract node, a managed function abstract node, and a connectivity abstract node, according to an embodiment of the disclosure.

Referring to FIG. 9, the NST/NSST 910 may include abstract node 920 representing an element of a slice/subnet. The abstract node 920 may include various abstract nodes. For example, the abstract node 920 may include the network slice subnet abstract node 930, the managed function abstract node 940, and the connectivity abstract node 950. In an embodiment, one NST/NSST 910 may be substituted with 1 to N1 abstract nodes 920. One NST/NSST 910 may include information about a type, exposed capabilities, input, and an interface.

In an embodiment, abstract nodes may share common features. For example, the abstract node 920 may include metadata including a name, and include another abstract node in a type hierarchy similarly to the NST/NSST 910. In addition to the metadata, the abstract node 920 may include requirements for specific elements which need to be satisfied in a deployment environment. The requirements for specific elements may be specified as a specific value or a range of values.

In an embodiment, the connectivity abstract node 950 may include information for specifying accessibility between abstract nodes such as the network slice subnet abstract node 930 and the managed function abstract node 940. As such, an electronic device may effectively generate a topology of abstract nodes.

In an embodiment, one network slice subnet abstract node 930 may be substituted with specific elements of 0 to N2 network slice subnet abstract nodes 930. One network slice subnet abstract node 930 may be substituted with 0 to N3 managed function abstract nodes 940 or 0 to N4 connectivity abstract nodes 950.

In an embodiment, the abstract node 920 may include abstractly defined runtime policies in addition to abstract nodes information. For example, the runtime policies may include information about performance management (PM) measurement, and fault management (FM) measurement, a threshold value for previously configuring elements, and a pre-defined profile.

Figure 10:
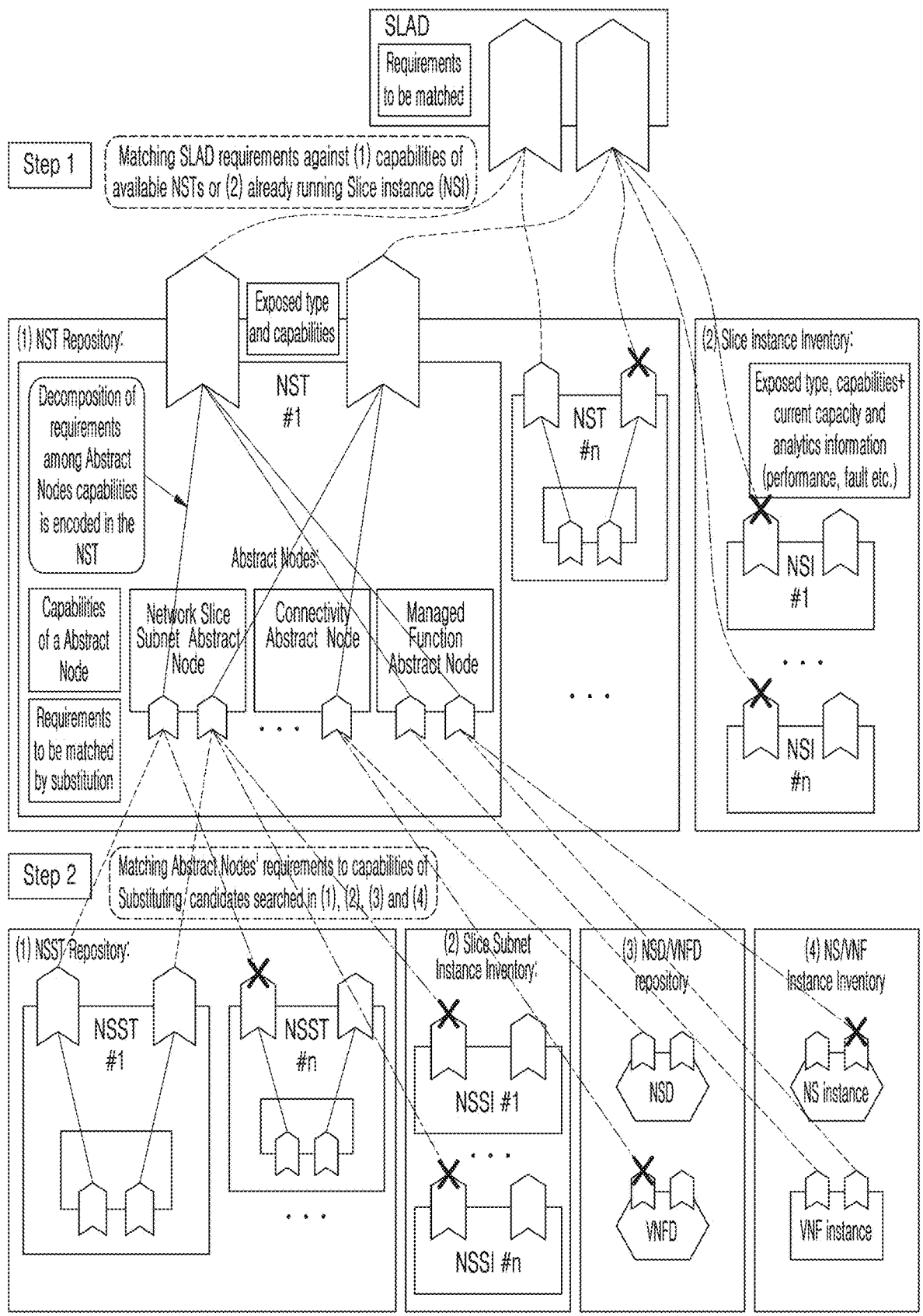
FIG. 10 is a block diagram for describing a method of generating a descriptor for a network slice corresponding to requirements, by using at least one of an NST or a network slice instance (NSI), according to an embodiment of the disclosure.

FIG. 10 is a block diagram for describing a method of generating a descriptor for a network slice corresponding to requirements, by using at least one of an NST or an NSI, according to an embodiment of the disclosure.

Referring to FIG. 10, an electronic device may generate an NSLD, an NSLSD, and an NSD satisfying obtained requirements, by using an SLAD serving as the obtained requirements. In an embodiment, each NST/NSST may be independent. That is, when viewed as a whole, one NST corresponding to one network slice may include first-level subnet abstract nodes, and a connectivity abstract node for connecting the first-level subnet abstract nodes. To generate an NST/NSST, the electronic device may determine a decomposition rule of requirements or a pre-defined profile for filling abstract nodes with specific elements. For example, the electronic device may decompose or substitute exposed capabilities of the NST into or with elements at an NSST or slice subnet instance level according to the decomposition rule or the pre-defined profile. The decomposition or substitution may be performed by dividing the requirements into partial requirements. The electronic device may substitute the abstract nodes included in the NST, with specific nodes by using a decomposition or substitution rule capable of selecting the most appropriate elements.

In an embodiment, the electronic device may select one of an NST, a running NSI, or a pre-generated NSLD, which best meets the SLAD serving as the obtained requirements. For example, the SLAD may be a service profile of 3GPP. The NST may be a template required by the electronic device to generate the NSLD, the NSLD may be a descriptor pre-generated using the NST, and the NSI may be a running network instance. The electronic device may obtain available candidates for generating a network slice, from an NST repository, an NSI inventory, and an NSLD repository. In an embodiment, when a large number of candidate entities are available, the electronic device may reduce the number of candidates by simply preselecting the candidate entities based on a broad category such as a type. The electronic device may determine the one, based on a comparison result between each attribute value of the SLAD and an attribute value of each candidate entity. For example, the comparison of each attribute may be performed using a binary value indicating satisfaction or dissatisfaction, a percentage, or a score. However, the comparison of each attribute is not limited to arithmetic comparison, and another comparison method such as geographical coverage of a slice may also be used. The electronic device may compare all available candidates or the selected candidate entities with the requirements, and then select the most appropriate candidate entity, based on the requirements. In an embodiment, the electronic device may select one optimal entity from among candidate entities having the same similarity, in consideration of an additional requirement such as the lowest cost. According to an embodiment, the electronic device may determine the optimal entity satisfying the requirements, by using simple calculation such as similarity comparison.

In an embodiment, when it is determined that the one which best meets the SLAD is the running NSI or the pre-generated NSLD, the electronic device may transmit the determined NSI or NSLD to entities or orchestrators for generating a network slice. As such, the entities for generating a network slice may generate a network slice which meets the SLAD, by using the received information. That is, when it is determined that the optimal entity satisfying the requirements is the NSI or NSLD, the entities for generating a network slice may generate a network slice by using the NSI or NSLD, and thus the electronic device may terminate the NSLD generation process.

In another embodiment, when it is determined that the one which best meets the SLAD is not the running NSI or the pre-generated NSLD, or when it is determined that the one which best meets the SLAD is the NST, the electronic device may select one NST which best meets the SLAD from among a plurality of NSTs. The one NST may include a plurality of abstract nodes. For example, the plurality of abstract nodes may include a network slice subnet abstract node, a managed function abstract node, and a connectivity abstract node. The electronic device may transform the abstract NST into a filled NST. That is, the electronic device may substitute all abstract nodes of the NST with specific nodes or specific elements. For example, the network slice subnet abstract node may be substituted with an NSST obtained from an NSST repository, an NSLSD obtained from an NSLSD repository, an existing NSSI obtained from an instance inventory, or an existing network service obtained from the instance inventory. The managed function abstract node may be substituted with an existing managed function obtained from the instance inventory, a VNFD or NSD obtained from an NSD/VNFD repository, a VNF instance obtained from the instance inventory, or a network service instance obtained from the instance inventory. The connectivity abstract node may be substituted with a virtual link obtained from the instance inventory, a virtual link obtained as a part of the generated NSD, an NSD obtained from an NSD repository, or an existing network service obtained from the instance inventory. In an embodiment, each of the plurality of abstract nodes may be substituted with at least one of elements in each repository/inventory based on similarity between each of the elements and the requirements. For example, to substitute the network slice subnet abstract node, the electronic device may compare the requirements with each of elements in the NSST repository, elements in the NSLSD repository, NSSIs in the instance inventory, elements in the NSD repository, and network services in the instance inventory, and select and substitute an optimal at least one for the abstract node. As another example, to substitute the managed function abstract node, the electronic device may compare the requirements with each of existing virtual functions in the instance inventory, existing VNFDs in the VNFD repository, existing NSDs in the NSD repository, existing VNF instances in the instance inventory, and existing network service instances in the instance inventory, and select and substitute an optimal at least one for the abstract node. As still another example, to substitute the connectivity abstract node, the electronic device may compare the requirements with each of virtual links in the instance inventory, virtual links in the generated NSD, NSDs in the NSD repository, and existing network services in the instance inventory, and select and substitute an optimal at least one for the abstract node. In an embodiment, when a large number of elements are to be compared with the requirements, the electronic device may select some of the elements based on a comprehensive criterion such as a type, compare the selected some with the requirements, and select and substitute an optimal at least one for the abstract node. The electronic device may recursively perform the substitution process until all abstract nodes are substituted. In an embodiment, when it is determined that all abstract nodes are substituted with specific nodes, the electronic device may generate a descriptor for a network slice by using the substituted abstract nodes. According to an embodiment, by selecting an NST before specifying a descriptor for a network slice to reduce comparison targets and complexity of calculation, and by applying the broadest search type, the electronic device may generate an optimal descriptor for a network slice to generate a network slice.

Figure 11:
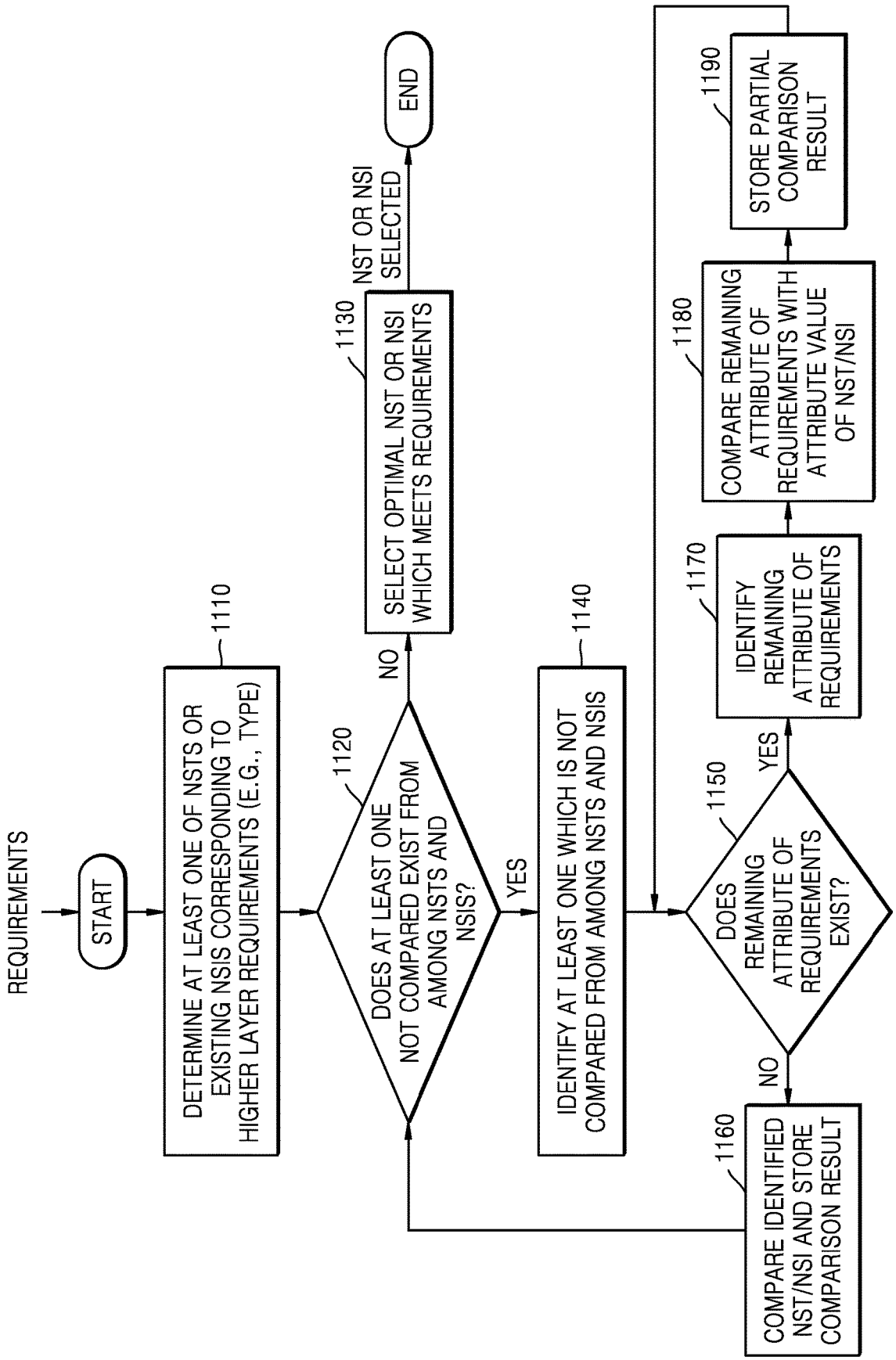
FIG. 11 is a flowchart of a method of selecting an optimal NST or NSI which meets requirements, according to an embodiment of the disclosure.

FIG. 11 is a flowchart of a method of selecting an optimal NST or NSI which meets requirements, according to an embodiment of the disclosure.

Referring to FIG. 11, in operation 1110, an electronic device may determine at least one of a plurality of NSTs or a plurality of NSIs corresponding to requirements of a higher layer. For example, the requirements of the higher layer may be a network slice type or a service to be provided. According to an embodiment, by determining a list including at least one of the plurality of NSTs or the plurality of NSIs, which satisfies the requirements of the higher layer, the electronic device may reduce comparison targets and complexity of calculation and accurately generate a descriptor for a network slice.

In operation 1120, the electronic device may determine whether at least one not compared with the requirements exists from among at least one NST and at least one NSI. In an embodiment, the electronic device may compare the requirements with each of the at least one NST and the at least one NSI included in the list, by using the list including the at least one determined in operation 1110. After determining whether one not compared with the requirements exists from among the at least one NST and the at least one NSI included in the list, the electronic device may perform operation 1130 when the one not compared with the requirements does not exist, or perform operation 1140 when the one not compared with the requirements exists.

In operation 1130, as a result of determining that the one not compared with the requirements does not exist from among the at least one NST and the at least one NSI included in the list, the electronic device may select an optimal NST or NSI which meets the requirements. For example, the electronic device may select the optimal NST or NSI by determining match or mismatch between the requirements and elements, by calculating and comparing matching scores between the requirements and the elements, or by considering similarity together with a cost, security, a location, and provider policies.

In operation 1140, as a result of determining that the one not compared with the requirements exists from among the at least one NST and the at least one NSI included in the list, the electronic device may identify the at least one which is not compared.

In operation 1150, the electronic device may determine whether a remaining attribute of the requirements exists. In an embodiment, the electronic device may perform operation 1170 as a result of determining that the remaining attribute of the requirements exists, or perform operation 1160 as a result of determining that the remaining attribute of the requirements does not exist. The remaining attribute of the requirements may refer to an attribute not compared with the NST and/or the NSI.

In operation 1160, as a result of determining that the remaining attribute of the requirements does not exist, the electronic device may compare the requirements with the at least one identified in operation 1140, and store the comparison result. As such, after comparing the requirements with the at least one identified in operation 1140, and storing the comparison result, the electronic device may compare its conformity with the requirements with those of other NSTs and NSIs. After performing operation 1160, the electronic device may perform operation 1120. As such, all NSTs and NSIs may be compared with the requirements by recursively performing operations 1120 to 1150 until the at least one not compared with the requirements does not exist from among one or more NSTs and one or more NSIs. Accordingly, in operation 1130, the electronic device may select an optimal NST or NSI which meets the requirements.

In operation 1170, as a result of determining that the remaining attribute of the requirements exists, the electronic device may identify the remaining attribute of the requirements.

In operation 1180, the electronic device may compare the remaining attribute of the requirements, which is identified in operation 1170, with an attribute value of the at least one of the NSTs or the NSIs, which is identified in operation 1140. For example, the electronic device may compare the attribute value by determining match or mismatch, by calculating matching scores, or by considering similarity together with other elements such as a cost, security, a location, and provider policies.

In operation 1190, the electronic device may store a partial comparison result corresponding to the result of comparison performed in operation 1180. After storing the comparison result, the electronic device may perform operation 1150. As such, the electronic device may recursively perform operations 1150 to 1190 until the remaining attribute of the requirements does not exist. When the remaining attribute of the requirements does not exist, the electronic device may perform operation 1160.

According to an embodiment, the electronic device may select the optimal NST or NSI which meets the requirements, by comparing all attributes of the NSTs and the NSIs with all attributes in the requirements. In an embodiment, the electronic device may perform operations to be described below with reference to FIG. 12, when an NST is selected as the optimal NST or NSI, or may not perform the operations to be described below with reference to FIG. 12, when an NSI is selected as the optimal NST or NSI.

Figure 12:
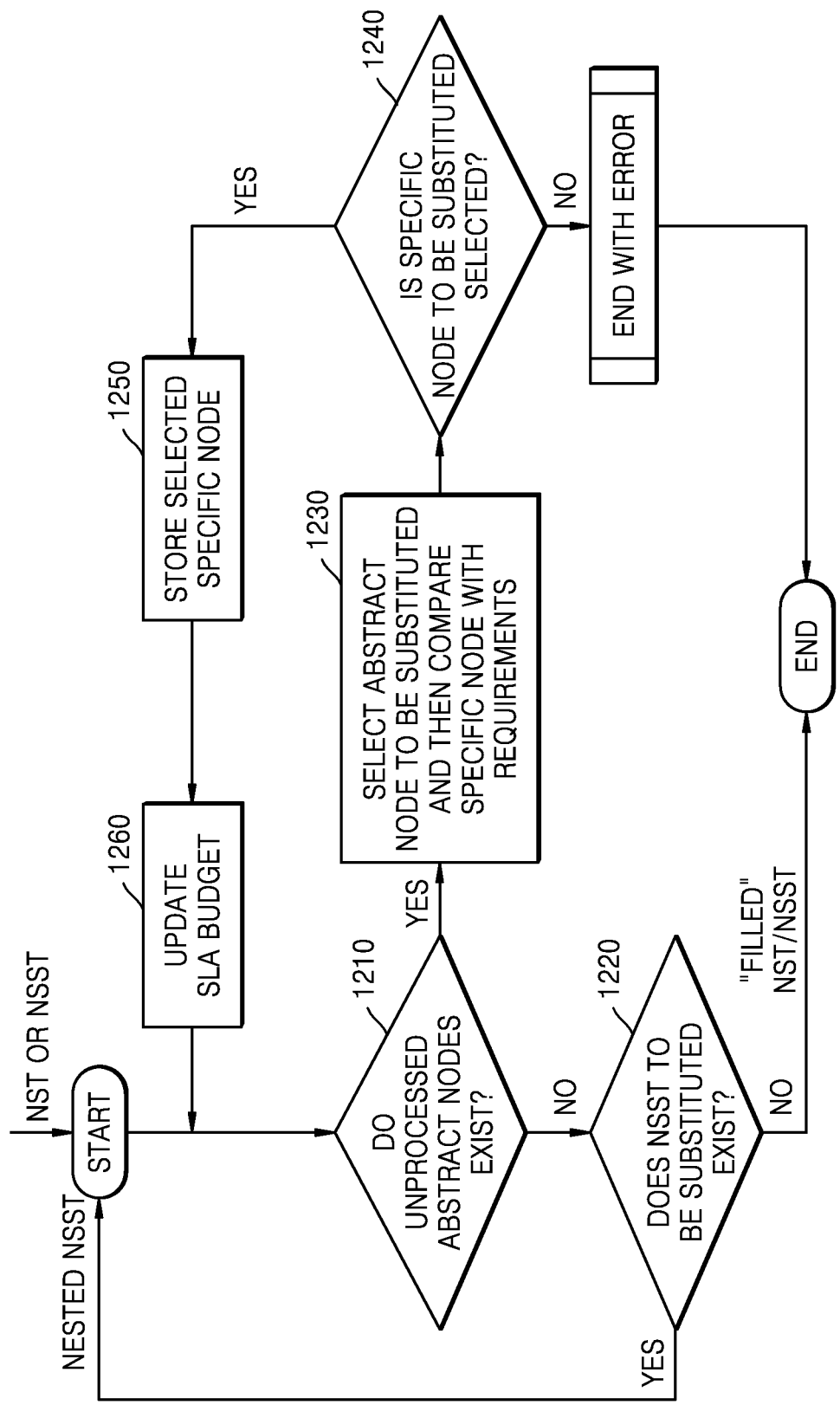
FIG. 12 is a flowchart of a method of generating a filled NST or a filled NSST by substituting an abstract node with an NSST by using an NST or NSI, according to an embodiment of the disclosure.

FIG. 12 is a flowchart of a method of generating a filled NST or a filled NSST by substituting an abstract node with an NSST by using an NST or NSI, according to an embodiment of the disclosure.

Referring to FIG. 12, in operation 1210, an electronic device may determine whether unprocessed abstract nodes exist in an NST or NSST. The electronic device may perform operation 1220 when it is determined that the unprocessed abstract nodes do not exist in the NST or NSST, or perform operation 1230 when it is determined that the unprocessed abstract nodes exist in the NST or NSST. In an embodiment, abstract nodes in the NST or NSST may include a network slice subnet abstract node, a connectivity abstract node, and a managed function abstract node.

In operation 1220, as a result of determining that the unprocessed abstract nodes do not exist, the electronic device may determine whether an NSST to be substituted exists. In an embodiment, the electronic device may substitute abstract nodes of the NST, and then substitute abstract nodes of the NSST. According to an embodiment, the electronic device may specify not only abstract nodes of the NST but also abstract nodes of a required NSST, and thus generate a network slice which satisfies requirements more accurately. The electronic device may perform operation 1210 when it is determined that the NSST to be substituted exists, or perform operations to be described below with reference to FIG. 13, when it is determined that one or more NSSTs are all specified and substituted.

In operation 1230, the electronic device may select an abstract node to be substituted from among the unprocessed abstract nodes and then compare requirements with at least one specific node to substitute for the selected abstract node. In an embodiment, the electronic device may select an NSST, an NSLSD, an existing NSSI, an NSD, or an existing network service as a specific node to substitute for the network slice subnet abstract node. The electronic device may select a virtual link, an NSD, or an existing network service as a specific node to substitute for the connectivity abstract node. The electronic device may select an existing managed function, a VNFD, an NSD, a VNF instance, or a network service instance as a specific node to substitute for the managed function abstract node.

In an embodiment, the electronic device may compare the selected at least one specific node with the requirements. For example, the electronic device may determine a matching score, based on similarity between the selected at least one specific node and the requirements. As another example, the electronic device may give a score to each specific node in consideration of similarity to the requirements, a cost, security, a location, or provider policies. In an embodiment, the electronic device may select an optimal specific node to substitute for the abstract node, based on the result of comparing the selected at least one specific node with the requirements.

In operation 1240, the electronic device may determine whether a specific node to be substituted is selected. In an embodiment, when it is determined that the specific node to be substituted is not selected, because a specific node which meets the requirements does not exist or an error has occurred, the electronic device may provide an error message and terminate the process. In another embodiment, when it is determined that the specific node to be substituted is selected, the electronic device may perform operation 1250.

In operation 1250, the electronic device may store the selected specific node. In an embodiment, the electronic device may store a specific node optimally selected to generate a descriptor for a network slice.

In operation 1260, the electronic device may update a SLA budget. In an embodiment, the electronic device may update the SLA budget, based on the selected specific node, and perform operation 1210. That is, the electronic device may recursively perform the operations of FIG. 12 until all abstract nodes of the NST or NSST are substituted.

Figure 13:
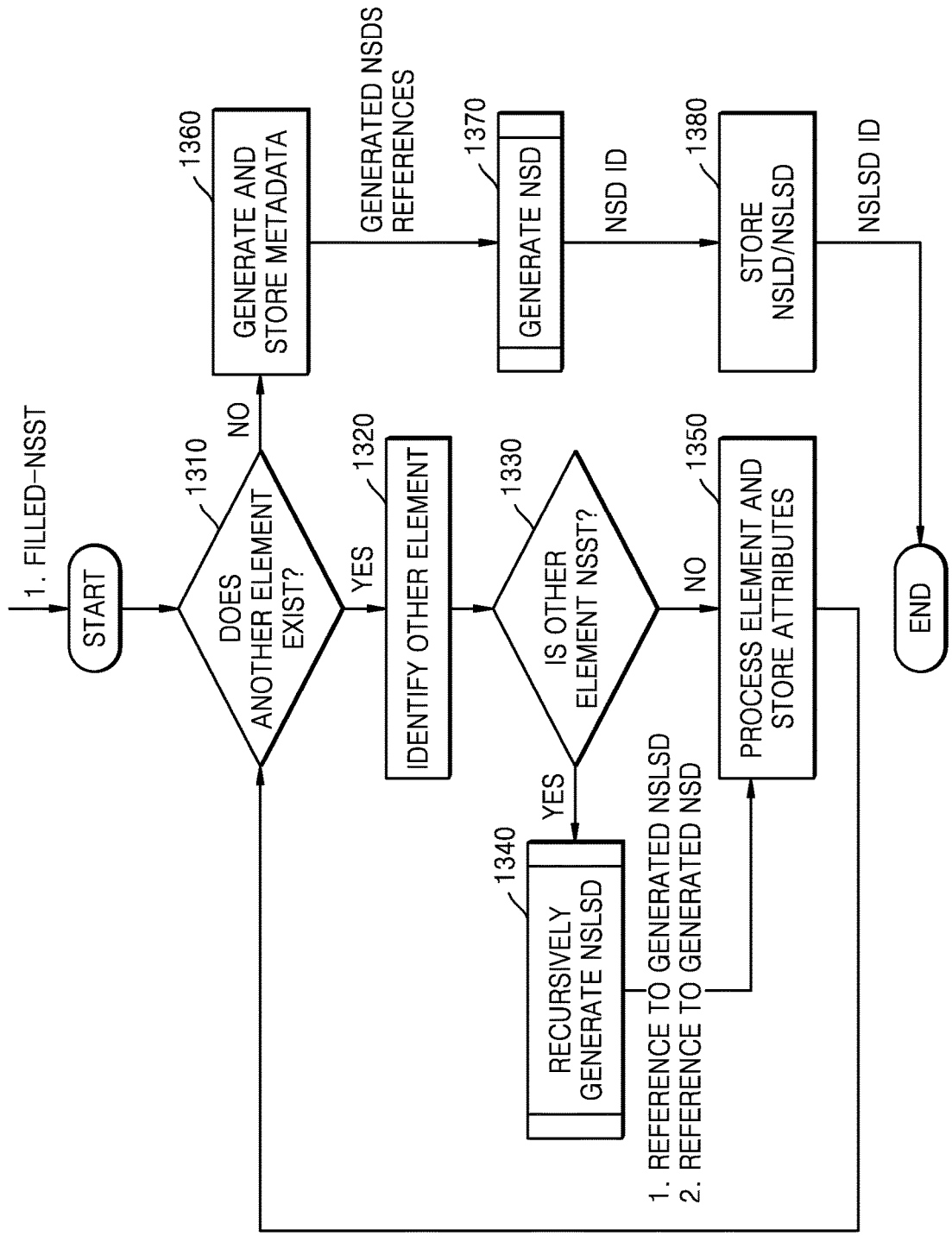
FIG. 13 is a flowchart of a method of generating an NSLD and a network slice subnet descriptor (NSLSD), according to an embodiment of the disclosure.

FIG. 13 is a flowchart of a method of generating an NSLD and an NSLSD, according to an embodiment of the disclosure.

Referring to FIG. 13, an electronic device may generate an NSLD and an NSLSD usable by a network slice orchestrator such as ETSI-NFV MANO or 3GPP NSMF/NSSMF, based on a "filled NST/NSST" including a reference to a specific element.

In operation 1310, the electronic device may determine whether another element exists in the filled NST/NSST. In an embodiment, the electronic device may perform operation 1320 when it is determined that the other element exists, or perform operation 1360 when it is determined that the other element does not exist.

In operation 1320, when it is determined that the other element exists in the filled NST/NSST, the electronic device may identify the other element.

In operation 1330, the electronic device may determine whether the identified other element is an NSST. In an embodiment, the electronic device may perform operation 1340 when the other element is the NSST, or perform operation 1350 when the other element is not the NSST.

In operation 1340, as a result of determining in operation 1330 that the identified other element is the NSST, the electronic device may recursively generate an NSLSD, based on the identified other element. The generated NSLSD may serve as a reference to a generated NSLSD and a generated NSD.

In operation 1350, the electronic device may process the element and store attributes thereof. For example, the attributes may include a reference, an identifier (ID), a name, a type, and a description of an origin NST/NSST. In an embodiment, as a result of determining in operation 1330 that the identified other element is not the NSST, the electronic device may process the element and store attributes thereof. In another embodiment, the electronic device may process the element of the NSLSD generated in operation 1340, and store attributes thereof. After processing the element and storing the attribute, the electronic device may perform operation 1310.

In operation 1360, as a result of determining that the other element does not exist, the electronic device may generate and store metadata of the filled NSST. In an embodiment, the metadata may include a reference, an ID, a name, a type, and a description of an origin NST/NSST. For example, a reference to the origin NST/NSST may be a reference to the origin NST/NSST which is used to generate the NSLD/NSLSD, and the electronic device may generate and store the reference to the origin NST/NSST by receiving an ID of an NST/NSST from a slice descriptors generator. As another example, attributes and a generation method of the metadata may be shown in Table 8.

TABLE 8

| Attribute group | Attribute | Qualifier | Cardinality | Content | Description | Generation method |
|---|---|---|---|---|---|---|
| metadata | reference | O | 1 | Identifier | reference to the NST/NSST that was used to create this NSLD/NSLD | NST/NSST id is known to the Slice Descriptors Generator |
| metadata | id | M | 1 | Identifier | id of this NSLD/NSLSD | automatically generated, for example as uuid or manually entered |
| metadata | name | O | 1 | String | name of this NSLD/NSLSD | Manually entered by user or automatically generated basing on NST name and other NST capabilities |
| matadata | type | M | 1 | String/Identifier | type of Network Slice or Network Slice Subnet described by this NSLD/NSLSD | Copied from NST/NSST |
| metadata | description | O | 1 | String | human readable description of this NSLD/NSLSD | Manually entered by user or automaically generated basing on NSLD/NSLSD capabillities. |

In operation 1370, the electronic device may generate an NSD. In an embodiment, the electronic device may generate the NSD, based on a reference to a generated NSD. The generated NSD may correspond to a child NSD to be described below with reference to FIG. 14.

In operation 1380, the electronic device may store the NSLD/NSLSD. In an embodiment, the electronic device may store the NSLD/NSLSD in an NSLD repository or an NSLSD repository. The electronic device may obtain an ID of the stored NSLD/NSLSD.

Figure 14:
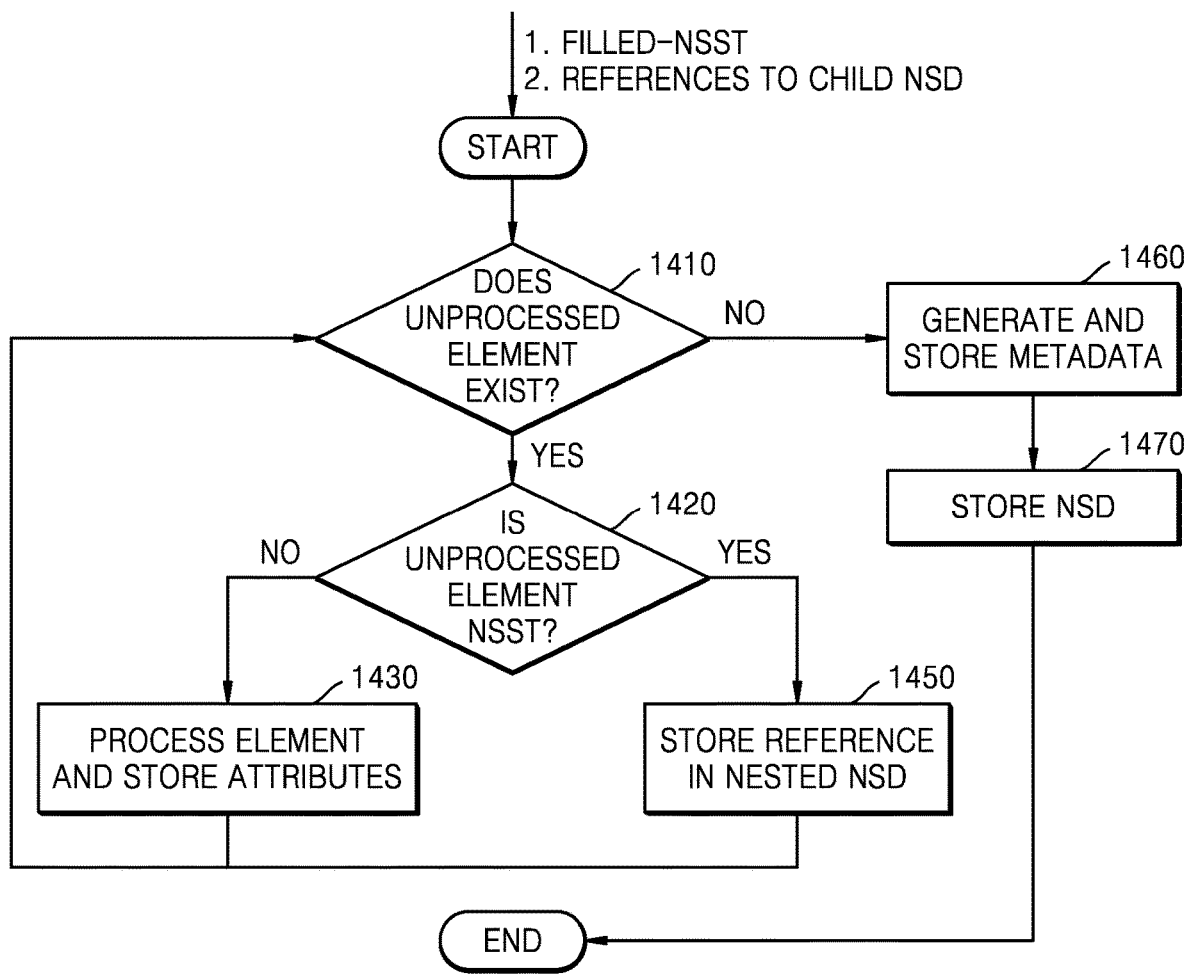
FIG. 14 is a flowchart of a method of generating an NSD, according to an embodiment of the disclosure.

FIG. 14 is a flowchart of a method of generating an NSD, according to an embodiment of the disclosure.

Referring to FIG. 14, an electronic device may generate an NSD usable by a network slice orchestrator such as ETSI-NFV MANO or 3GPP NSMF/NSSMF, based on a "filled NST/NSST" including a reference to a specific element, and a reference to a child NSD.

In operation 1410, the electronic device may determine whether an unprocessed element exists. In an embodiment, the electronic device may perform operation 1420 when it is determined that the unprocessed element exists, or perform operation 1460 when it is determined that the unprocessed element does not exist.

In operation 1420, the electronic device may determine whether the unprocessed element is an NSST. In an embodiment, the electronic device may perform operation 1430 when it is determined that the unprocessed element is not the NSST, or perform operation 1450 when it is determined that the unprocessed element is the NSST.

In operation 1430, when it is determined that the unprocessed element is not the NSST, the electronic device may process the unprocessed element and store attributes of the element. For example, the attributes may include a reference, an ID, a name, a type, and a description of an origin NST/NSST. In an embodiment, after processing the unprocessed element and storing the attributes of the element, the electronic device may perform operation 1410.

In operation 1450, when it is determined that the unprocessed element is the NSST, the electronic device may store a reference to the NSST, which is the unprocessed element, in a nested NSD. In an embodiment, after storing the reference to the NSST in the nested NSD, the electronic device may perform operation 1410.

In operation 1460, the electronic device may generate and store metadata. For example, the metadata may include attributes shown in Table 9, and be generated using a generation method shown in Table 9.

TABLE 9

| Attribute | Qualifier | Cardinality | Content | Description | Generation method |
| --- | --- | --- | --- | --- | --- |
| nsdIdentifier | M | 1 | Identifier | Identifiers of this NSD information element. It globally uniquelyidentifies an instance of the NSD. | automatically generated, for example as uuid or manually entered |
| designer | M | 1 | String | Identifies the designer of the NSD. | manually entered by user or automaticallygenerated based on the system login information |
| version | M | 1 | Version | Identifies the version of the NSD. | manually entered by user or automatically generated . based on NST version, date etc |
| nsdName | M | 1 | String | Provides the human readable name of the NSD. | manually enetered by user or automatically generated based on NST name and chosen content information |
| nsdInvariantId | M | 1 | Identifier | Identifies an NSD in a version independent manner. This attribute is invariant across versions of NSD. | automatically generated, for example as uuid or manually entered |
| nestedNsdId | M | 0.N | Identifier (Reference to Vnfd) | References the NSD of a constituent nested NS. At least one between nestedNsd and vnfdId attributes shall be present. | assigned based on the NSD references determined during "Abstract Node Substitution" process. References include newly generated NSDs where NSST was matched to Abstract Network Slice Subnet curing "Abstract Node Substitution"—such NSDs are generated before parent NSDs |
| vnfdId | M | 0.N | Identifier (Reference to Vnfd) | References the VNFD of a constituent VNF. At least one between nestedNsd and vnfdID attributes shall be present. | assigned based on the VNF references determined during "Abstract Node Substitution" process |
| pnfdId | M | 0.N | Identifier (Reference to Pnfd) | References the PNFO of a constituent PNF. At least one between nestedNsd and vnfId attributes shall be present. | assigned based on the PNF references determined during "Abstract Node Substitution" process |
| sapd | M | 0.N | Sapd | Provides the descriptor of a service access point of the network service. | generated by analizing Connectivity Nodes and connections to Network Slice Subnet and Managed Function Nodes |
| virtualLinkDesc | M | 0.N | NsVirtualLinkDesc | Provides the constituent VLDs, Cardinality if 0 means that the NS is a NF set with unspecified connectivity. | generated according to the methods described in "NsVirtualLinkDesc" subsheet |
| vnffgd | M | 0.N | Vnffgd | Provides the descriptors of the applicable forwarding graphs. Cardinality of 0 means that the NS is a set with unspecified connectivity. | not generated—can be supplemented manually by the operator after generation |

TABLE 9-continued

| Attribute | Qualifier | Cardinality | Content | Description | Generation method |
|---|---|---|---|---|---|
| autoScalingRule | M | 0..N | Rule | Specifies a rule to trigger a scaling action on an NS instantiated according to the NSD. The rule is based on a combination of assertions on the values of virtual resource-related performance metrics and VNF indicators identified by the monitored Info attribute of the NsDffrom which the NS instance is created . There may be multiple data sources per rule, each corresponding to a different monitoredInfo attribute occurrence of the NsDf from which the NS instance created. | not generate—can be supplemented manually by the operator after generation |
| lifeCycleManagmentScript | M | 0..N | LifeCycle ManagmenetScript | Provides a life cycle management script written in a Domain SpecificLanguage (DSL). | not generated—can be supplemented manually by the operator after generation |
| nsDf | M | 1..N | NsDf | Identifies a DF within the scope of an NSD. | generation of a single Deployment Flavour described in the "NsDf" subsheet |
| security | M | 1 | SecurityParameters | Provides a signature to prevent tampering | generated by standard cryptography digital signature algorithms |

In operation 1470, the electronic device may store a generated NSD. In an embodiment, the electronic device may store the generated NSD in an NSD repository.

Figure 15:
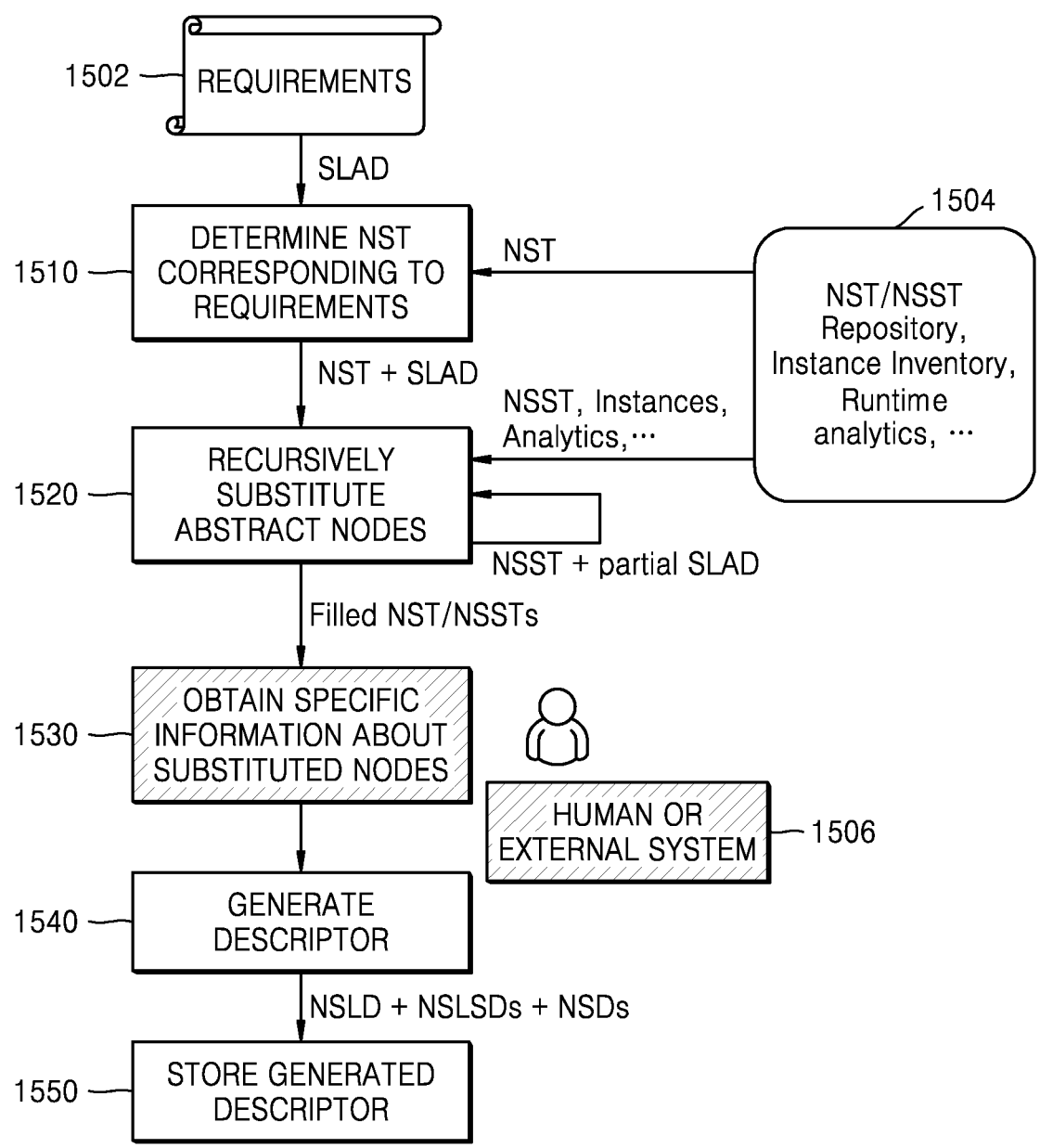
FIG. 15 is a flowchart of a method of generating and storing a descriptor by obtaining specific information about substituted nodes by using a human or an external system, according to an embodiment of the disclosure.

FIG. 15 is a flowchart of a method of generating and storing a descriptor by obtaining specific information about substituted nodes by using a human or an external system, according to an embodiment of the disclosure.

Referring to FIG. 15, operations 1510, 1520, 1540, and 1550 may respectively correspond to operations 710, 720, 730, and 740 described above with reference to FIG. 7. However, operation 1530 may be further performed.

In operation 1510, an electronic device may determine an NST corresponding to requirements 1502. In an embodiment, the electronic device may determine at least one of the NST, an existing NSI, or a pre-generated NSLD, based on similarity to the requirements 1502 and other factors. For example, when an NSI or NSLD which meets the obtained requirements 1502 exists, the electronic device may not perform operations 1520 to 1540. As another example, the electronic device may obtain the NST corresponding to the requirements 1502 from an NST/NSST repository 1504 and perform operation 1520.

In operation 1520, when the NST is determined in operation 1510, the electronic device may recursively substitute abstract nodes included in the determined NST, by using the determined NST and the requirements 1502. In an embodiment, the abstract nodes included in the NST may include a network slice subnet abstract node, a connectivity abstract node, and a managed function abstract node. Each abstract node may include a plurality of abstract nodes. The electronic device may obtain information from an NSST repository, an instance inventory, a runtime analytics, etc., and recursively substitute the abstract nodes included in the NST, to meet the requirements 1502. As such, the electronic device may generate a "filled NST/NSSTs." That is, the electronic device may generate an NST in which all of a plurality of abstract nodes are substituted, and one or more NSSTs in which all abstract nodes are substituted.

In operation 1530, the electronic device may obtain specific information about the substituted nodes. In an embodiment, the electronic device may obtain the specific information about the substituted nodes from a human or external system 1506.

In operation 1540, the electronic device may generate a descriptor for a network slice by using the obtained specific information and the "filled NST/NSSTs" in which the abstract nodes are substituted. In an embodiment, the descriptor for a network slice may include an NSLD, one or more NSLSDs, and one or more NSDs.

In operation 1550, the electronic device may store the generated descriptor. According to an embodiment, by storing the generated descriptor, when other requirements are the same as or similar to the requirements 1502, the electronic device may rapidly generate a network slice by using the stored descriptor.

Figure 16:
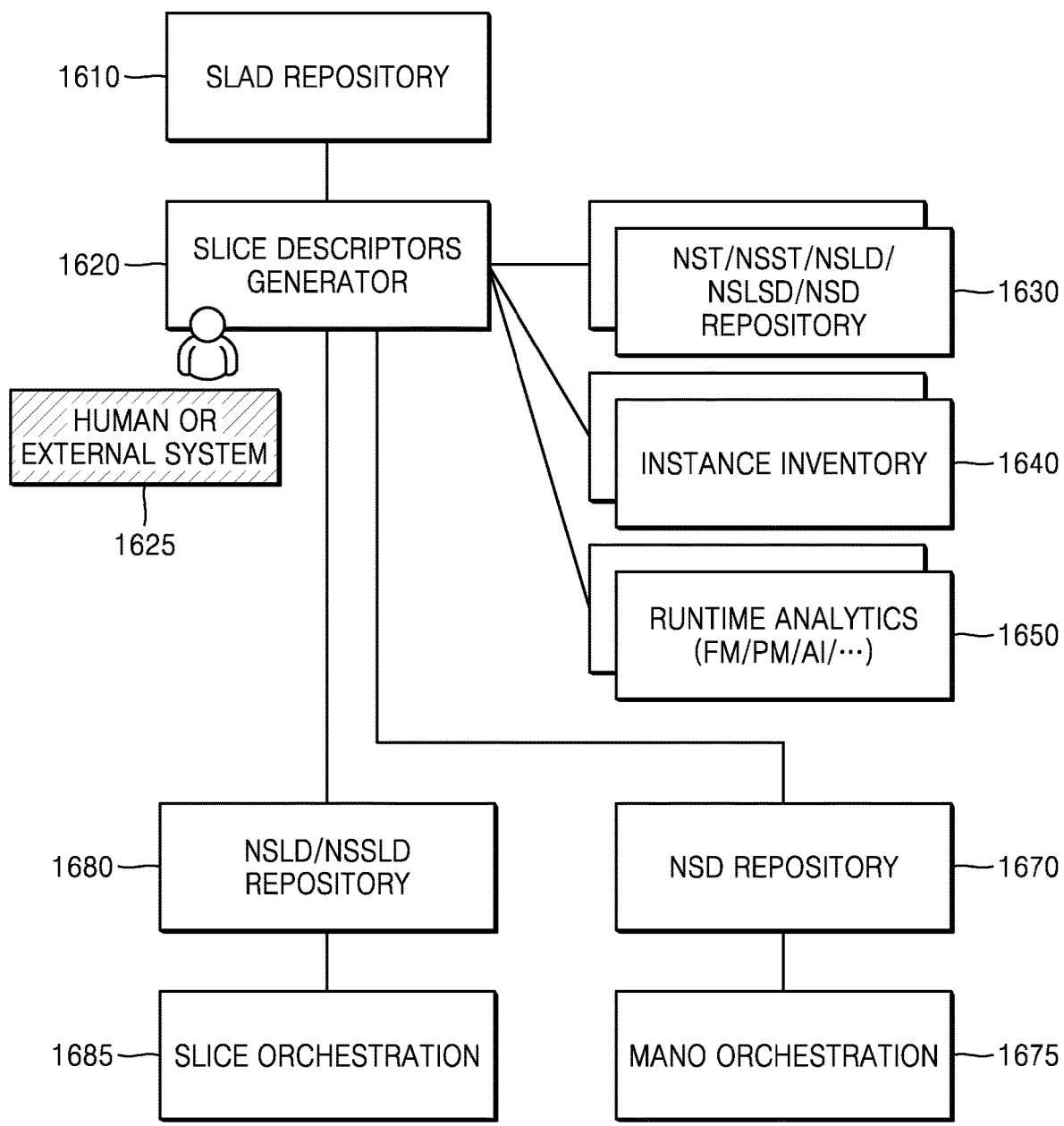
FIG. 16 is a block diagram of apparatuses for generating and storing a descriptor by obtaining specific information about substituted nodes by using a human or an external system, according to an embodiment of the disclosure.

FIG. 16 is a block diagram of apparatuses for generating and storing a descriptor by obtaining specific information about substituted nodes by using a human or an external system, according to an embodiment of the disclosure.

Referring to FIG. 16, apparatuses for performing the operations described above with reference to FIG. 15 may be shown. In an embodiment, an SLAD repository 1610 may correspond to the SLAD repository 810 described above with reference to FIG. 8. The SLAD repository 1610 may store requirements for a network slice. For example, the requirements for a network slice may include requirements related to QoS parameters, e.g., an SLAD, a bandwidth, and latency, non-functional requirements, e.g., availability, security, geolocation, and shareability, or requirements according to a combination of a 3GPP service profile and a GSMA GST.

In an embodiment, a slice descriptors generator 1620 may generate an NSLD, NSLSDs, and NSDs by obtaining the requirements for a network slice from the SLAD repository 1610, obtaining NST/NSST/NSLD/NSLSD/NSD information from an NST/NSST/NSLD/NSLSD/NSD repository 1630, obtaining NSI information from an instance inventory 1640, and obtaining runtime information from a runtime analytics 1650. In addition, the slice descriptors generator 1620 may obtain specific information about substituted abstract nodes from a human or external system 1625.

In an embodiment, an NSLD/NSLSD repository 1680 may correspond to the NSLD/NSLSD repository 860 described above with reference to FIG. 8. The NSLD/NSLSD repository 1680 may store the NSLD and NSLSDs generated by the slice descriptors generator 1620. In an embodiment, an NSD repository 1670 may correspond to the NSD repository 870 described above with reference to FIG. 8. The NSD repository 1670 may store the NSDs generated by the slice descriptors generator 1620.

A slice orchestrator 1685 and a MANO orchestrator 1675 may respectively correspond to the slice orchestrator 880 and the MANO orchestrator 890 described above with reference to FIG. 8. The slice orchestrator 1685 may obtain the stored NSLD/NSLSDs from the NSLD/NSLSD repository 1680, and the MANO orchestrator 1675 may obtain the stored NSDs from the NSD repository 1670. The slice orchestrator 1685 and the MANO orchestrator 1675 may cooperate with each other to generate a network slice by using the obtained information.

Figure 17:
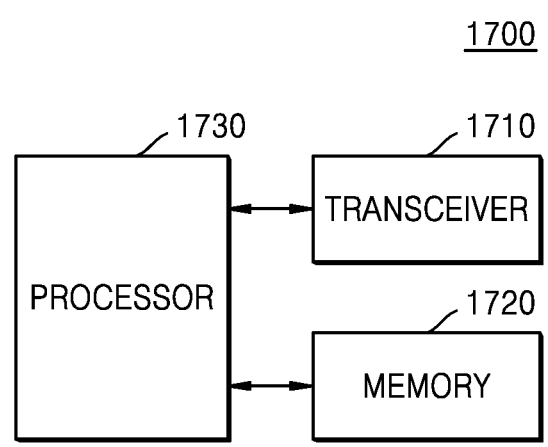
FIG. 17 is a block diagram of an electronic device for generating a descriptor for a network slice, according to an embodiment of the disclosure.

FIG. 17 is a block diagram of an electronic device for generating a descriptor for a network slice, according to an embodiment.

Referring to FIG. 17, an electronic device 1700 may include a processor 1730, a memory 1720, and a transceiver 1710. The processor 1730, the memory 1720, and the transceiver 1710 of the electronic device 1700 may operate according to the above-described communication method. However, the elements of the electronic device 1700 are not limited to the above-mentioned examples. For example, the electronic device 1700 may include more or fewer elements than those mentioned above. The processor 1730, the memory 1720, and the transceiver 1710 may be implemented in the form of a single chip. The processor 1730 may include one or more processors.

In an embodiment, the processor 1730 may obtain requirements for a network slice, determine at least one of a plurality of NSTs, a plurality of NSLDs, or a plurality of NSIs, based on the obtained requirements, when at least one of the plurality of NSTs is determined, determine at least one specific node to substitute for a plurality of abstract nodes included in the at least one of the plurality of NSTs, based on the obtained requirements, and generate a descriptor for a network slice, based on the determined at least one specific node.

In an embodiment, the transceiver 1710 may communicate with a UE, a repository/inventory, or another electronic device, which is connected to the electronic device 1700 in a wired or wireless manner. In the memory 1720, programs such as applications and various types of data such as files may be installed and stored. The processor 1730 may access and use the data stored in the memory 1720, or store new data in the memory 1720. In an embodiment, the memory 1720 may include a database. In an embodiment, the memory 1720 may store the descriptor generated by the electronic device 1700.

The processor 1730 may control overall operation of the electronic device 1700, and include one or more processors, e.g., a central processing unit (CPU) and a graphics processing unit (GPU). The processor 1730 may control the other elements included in the electronic device 1700, to perform operations for operating the electronic device 1700. For example, the processor 1730 may execute the programs stored in the memory 1720, read the stored files, or store new files. In an embodiment, the processor 1730 may perform operations for operating the electronic device 1700, by executing the programs stored in the memory 1720.

FIG. 18 is Table showing information included in an NST, according to an embodiment of the disclosure.

Referring to FIG. 18, information included in the NST may correspond to Table 1 described above with reference to FIG. 5. For example, the NST may include an ID, a name, a description, a type, a SLA, functional, a capacity, coverage, a sharing level, operations, network slice subnet abstract nodes, managed function abstract nodes, connectivity abstract nodes, performance management policies, and fault management policies.

FIG. 19 is Table showing information included in network slice subnet abstract nodes, according to an embodiment of the disclosure.

Referring to FIG. 19, information included in a network slice subnet abstract nodes may correspond to Table 2 described above with reference to FIG. 5. For example, the network slice subnet abstract nodes may include an ID, a name, a description, a network slice subnet type, SLA requirements, functional requirements, capacity requirements, a sharing level requirement, coverage, operations, performance management policies, and fault management policies.

FIG. 20 is Table showing information included in managed function abstract nodes, according to an embodiment of the disclosure.

Referring to FIG. 20, information included in managed function abstract nodes may correspond to Table 3 described above with reference to FIG. 5. For example, the managed function abstract nodes may include an ID, a name, a description, a managed function (MF) type, a SLA, functional, a capacity, a sharing level, operations, performance management policies, fault management policies, and abstract application configuration.

FIG. 21 is Table showing information included in connectivity abstract nodes, according to an embodiment of the disclosure.

Referring to FIG. 21, information included in the connectivity abstract nodes may correspond to Table 4 described above with reference to FIG. 5. For example, the connectivity abstract nodes may include an ID, a name, a description, maximum bitrate requirements, minimum bitrate requirements, a layer protocol, a flow pattern, latency, a packet delay variation, a packet loss ratio, a priority, capacity requirements, a sharing level requirement, performance management policies, and fault management policies.

FIG. 22 is Table showing information included in metadata, according to an embodiment of the disclosure.

Referring to FIG. 22, information included in the metadata may correspond to Table 8 described above with reference to FIG. 13. For example, the metadata may include a reference, an ID, a name, a type, and a description. In an embodiment, the reference may be a reference number of an NST/NSST used to generate an NSLD/NSLSD.

Some embodiments may be implemented in the form of a recording medium including instructions executable by a computer, e.g., a program module executable by the computer. A computer-readable medium may be an arbitrary available medium accessible by the computer, and examples thereof include all of volatile and non-volatile media, and detachable and non-detachable media. The computer-readable medium may include a computer storage medium. Examples of the computer storage medium include all of volatile and non-volatile, and detachable and non-detachable media implemented using an arbitrary method or technology for storing information such as computer-readable instructions, data structures, program modules, or other data.

The afore-described embodiments of the disclosure may be implemented using a software program including instructions stored in a computer-readable storage medium.

The computer is a device capable of fetching instructions stored in a storage medium, and operating according to the embodiments of the disclosure based on the fetched instructions, and may include an electronic device according to the embodiments of the disclosure.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

A control method according to the embodiments of the disclosure may be included and provided in a computer program product. The computer program product may be traded between a seller and a purchaser as a commercial product.

The computer program product may include a software program, and a computer-readable storage medium having the software program stored therein. For example, the computer program product may include a commercial product that is electronically distributed in the form of a software program (e.g., a downloadable application) via a device manufacturer or an electronic market (e.g., Google Play or App Store). For electronic distribution, at least a part of the software program may be stored in the storage medium or be temporarily generated. In this case, the storage medium may be a storage medium of a server of the manufacturer, a server of the electronic market, or a relay server that temporarily stores the software program.

The computer program product may include a storage medium of a server or a storage medium of a device in a system including the server and the device. Otherwise, when a third device (e.g., a smartphone) communicatively connected to the server or the device is present, the computer program product may include a storage medium of the third device. Alternatively, the computer program product may include a software program itself that is transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored therein, to control the device, which is communicatively connected to the server, to perform the method according to the embodiments of the disclosure.

As another example, the third device may execute the computer program product to control the device, which is communicatively connected to the third device, to perform the method according to the embodiments of the disclosure. When the third device executes the computer program product, the third device may download the computer program product from the server and execute the downloaded computer program product. Alternatively, the third device may execute the computer program product, which is provided in a preloaded state, to perform the method according to the embodiments of the disclosure.

As used herein, the term "unit" may indicate a hardware component such as a processor or a circuit, and/or a software component executable by the hardware component such as the processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a transceiver;
   memory storing one or more instructions; and
   at least one processor configured to execute the one or more instructions stored in the memory to:
      obtain requirements for a network slice,
      select at least one candidate out of a plurality of abstract network slice templates (NSTs), a plurality of network slice descriptors (NSLDs), or a plurality of existing network slice instances (NSIs), respectively considered as candidates, based on a determined highest score of obtained requirements satisfaction by exposed capabilities of the candidates,
      select at least one specific node to substitute for a plurality of abstract nodes included in a selected at least one abstract NST based on the determined highest score of abstract nodes requirements satisfaction by the exposed capabilities of specific nodes,
      generate a new NSLD based on the selected at least one abstract NST,
      generate at least one new network slice subnet descriptor (NSLSD) and at least one corresponding new network service descriptor (NSD) based on each network slice subnet abstract node included in the selected at least one abstract NST, and
      pass the new NSLD, and the at least one new NSLSD to a slicing orchestrator for instantiating an NSI and at least one network slice subnet instance (NSSI), and pass the at least one new NSD to a network functions virtualization orchestrator (NFVO) for instantiating a network service (NS) instance corresponding to the at least one instantiated NSSI for satisfying the obtained requirements.

2. The electronic device of claim 1, wherein the obtained requirements comprise at least one of quality of service requirements, a service level agreement, service provider preference, a latency requirement, a bandwidth requirement, user equipment (UE) functions, subscription information, a cost, or a service type.

3. The electronic device of claim 1, wherein the at least one processor is further configured to
   execute the one or more instructions to, when at least one of the plurality of NSIs is selected as a candidate with the highest score of obtained requirements satisfaction by its exposed capabilities, transmit to an orchestrator configured to reuse the selected at least one of the plurality of NSIs and
   execute the one or more instructions to, when at least one of the plurality of NSLDs is selected as a candidate with the highest score of obtained requirements satisfaction by its exposed capabilities, transmit to an orchestrator configured to create an NSI based on the selected at least one of the plurality of NSLDs.

4. The electronic device of claim 1, wherein the plurality of abstract nodes comprise at least one of a network slice subnet abstract node, a connectivity abstract node, or a managed function abstract node.

5. The electronic device of claim 4,
wherein the plurality of abstract nodes, in response to at least one of the plurality of NSTs being selected, comprise at least one network slice subnet abstract node,
wherein the at least one processor is further configured to execute the one or more instructions to:
select at least one of a network slice subnet template (NSST), an NSLSD, an existing NSSI, an NSD, or an existing NS instance respectively considered as specific nodes, based on determined highest score of network slice subnet abstract node requirements satisfaction by the exposed capabilities of specific nodes, and
determine the selected at least one as at least one specific node to substitute for the at least one network slice subnet abstract node, and
wherein the network slice subnet abstract node requirements are determined based on obtained requirements.

6. The electronic device of claim 4,
wherein the plurality of abstract nodes, in response to at least one of the plurality of NSTs being selected, comprise at least one connectively abstract node,
wherein the at least one processor is further configured to execute the one or more instructions to:
select at least one of an existing virtual link, an NSD, or an existing NS instance, respectively considered as specific nodes, based on a determined highest score of connectivity abstract mode requirements satisfaction by the exposed capabilities of specific nodes, and
determine the selected at least one as at least one specific node to substitute for the at least one connectivity abstract node, and
wherein the connectivity abstract node requirements are determined based on obtained requirements.

7. The electronic device of claim 4,
wherein the plurality of abstract nodes, in response at at least one of the plurality of NSTs being selected, comprise at least one managed function abstract node,
wherein the at least one processor is further configured to execute the one or more instructions to:
select at least one of an existing managed function, a virtual network function (VNF) descriptor (VNFD), an NSD, a VNF instance, or a NS instance, respectively considered as specific nodes, based on a determined highest score of managed function abstract node requiremnets satisfaction by the exposed capabilities of specific nodes, and
determine the selected at least one as at least one specific node to substitute for the at least one managed function abstract node, and
wherein the managed function abstract node requirements are determined based on obtained requirements.

8. The electronic device of claim 4, wherein the at least one processor is further configured to execute the one or more instructions to:
in response to at least one of the plurality of NSTs being determined, substitute a plurality of abstract nodes included in the selected at least one of the plurality of NSTs, into a part or an entirety of specific nodes;
determine whether each of the plurality of abstract nodes is substituted with a part or an entirety of the specific nodes satisfying the requirements of the abstract node;
in response to it being determined that each of the plurality of abstract nodes is not substituted with a part or an entirety of the specific nodes satisfying the abstract node requirements, substitute at least one abstract node determined as not being substituted, with a part or an entirety of at least one specific node satisfying the abstract node requirements; and
in response to it being determined that each of the plurality of abstract nodes is substituted with a part or an entirety of the specific node satisfying the abstract node requirements, generate a set of NSLD and NSLSD descriptors, based on a structure of NST selected as a candidate with the highest score of obtained requirements and of NSSTs that substituted the network slice subnet abstract nodes in the selected NST recursively selected NSSTs.

9. The electronic device of claim 1,
wherein the plurality of abstract nodes comprise at least one of the network slice subnet abstract noce, a connectivity abstract node, or a managed function abstract node,
wherein a specific node to substitute a given network slice subnet abstract node is selected out of at least one of NSSTs, NSLDs, existing NSSIs, NSDs, or existing NS instances, based on the determined highest score of network slice subnet abstract node requirements satisfaction by exposed capabilities of specific nodes,
wherein a specific node to substitute a given managed function abstract node is selected out of at least one of existing managed functions, an existing virtual network function (VNF), a virtual network function descriptor (VDFD), an NSD or existing NS instances based on the determined highest score of managed function abstract node requirements satisfaction by exposed capabilities of specific nodes, and
wherein a specific node to substitute a given connectivity abstract node is selected out of at least one of the an existing virtual link, an NSD or an existing NS instance based on the determined highest score of connectivity abstract node requirements satisfaction by exposed capabilities of specific nodes.

10. An operating method of an electronic device for generating a descriptor for a network slice, the operating method comprising:
obtaining requirements for a network slice;
selecting at least one candidate out of a plurality of abstract network slice templates (NSTs), a plurality of network slice descriptors (NSLDs), or a plurality of existing network slice instances (NSIs), respectively considered as candidates, based on a determined highest score of obtained requirements satisfaction by exposed capabilities of the candidates;
selecting at least one specific node to substitute for a plurality of abstract nodes included in a selected at least one abstract NST based on the determined highest score of abstract nodes requirements satisfaction by the exposed capabilities of specific nodes; and
generating a new NSLD based on the selected at least one abstract NST,
generating at least one new network slice subnet descriptor (NSLSD) and at least one corresponding new network service descriptor (NSD) based on each network slice subnet abstract node included in the selected at least one abstract NST, and passing the new NSLD, and the at least one new NSLSD to a slicing orchestrator for instantiating an NSI and at least one network slice subnet instance (NSSI), and passing the at least one new NSD to a network functions virtualization orchestrator (NFVO) for instantiating a network service (NS) instance corresponding to the at least one instantiated NSSI for satisfying the obtained requirements.

11. The operating method of claim 10, wherein the obtained requirements comprise at least one of quality of service requirements, a service level agreement, service provider preference, a latency requirement, a bandwidth requirement, user equipment (UE) functions, subscription information, a cost, or a service type.

12. The operating method of claim 10, wherein the plurality of abstract nodes comprise at least one of a network slice subnet abstract node, a connectivity abstract node, or a managed function abstract node.

13. The operating method of claim 10, further comprising:
when at least one of the plurality of NSIs is selected as a candidate with the highest score of obtained requirements satisfaction by its exposed capabilities, transmitting to an orchestrator configured to reuse the selected at least one of the plurality of NSIs; and
when at least one of the plurality of NSLDs is selected as a candidate with the highest score of obtained requirements satisfaction by its exposed capabilities, transmitting to an orchestrator configured to create an NSI based on the selected at least one of the plurality of NSLDs.

14. A non-transitory computer-readable recording medium having stored therein one or more programs to be executed by one or more processors of a computing device to control the computing device to:
obtain requirements for a network slice;
select at least one candidate out of a plurality of abstract network slice templates (NSTs), a plurality of network slice descriptors (NSLDs), or a plurality of existing network slice instances (NSIs), respectively considered as candidates, based on a determined highest score of obtained requirements satisfaction by exposed capabilities of the candidates;
select at least one specific node to substitute for a plurality of abstract nodes included in a selected at least one abstract NST based on the determined highest score of abstract nodes requirements satisfaction by the exposed capabilities of specific nodes; and
generate a new NSLD based on the selected at least one abstract NST,
generate at least one new network slice subnet descriptor (NSLSD) and at least one corresponding new network service descriptor (NSD) based on each network slice subnet abstract node included in the selected at least one abstract NST, and
pass the new NSLD, and the at least one new NSLSD to a slicing orchestrator for instantiating an NSI and at least one network slice subnet instance (NSSI), and pass the at least one new NSD to a network functions virtualization orchestrator (NFVO) for instantiating a network service (NS) instance corresponding to the at least one instantiated NSSI for satisfying the obtained requirements.

15. The non-transitory computer-readable recording medium of claim 14, wherein the one or more processors of the computing device further control the computing device to:
where at least one of the plurality of NSIs is selected as a candidate with the highest score of obtained requirements satisfaction by its exposed capabilities, transmit to an orchestrator configured to reuse the selected at least one plurality of NSIs, and
when at least one of the plurality of NSLDs is selected as a candidate with the highest score of obtained requirements satisfaction by its exposed capabilities, transmit to an orchestrator configured to create an NSI based on the selected at least one of the plurality of NSLDs.

* * * * *